United States Patent [19]

Mizuno et al.

[11] Patent Number: 5,346,736
[45] Date of Patent: Sep. 13, 1994

[54] MAGNETIC TAPE CASSETTE

[75] Inventors: Masato Mizuno; Kengo Oishi, both of Kanagawa, Japan

[73] Assignee: Fuji Photo Film Co., Ltd., Kanagawa, Japan

[21] Appl. No.: 991,290

[22] Filed: Dec. 15, 1992

Related U.S. Application Data

[62] Division of Ser. No. 889,434, May 28, 1992, Pat. No. 5,219,074, which is a division of Ser. No. 799,204, Nov. 27, 1991, Pat. No. 5,175,661, which is a division of Ser. No. 697,560, May 9, 1991, Pat. No. 5,101,307, which is a division of Ser. No. 323,926, Mar. 15, 1989, Pat. No. 5,041,938.

[30] Foreign Application Priority Data

| Mar. 15, 1988 | [JP] | Japan | 63-33175 |
| Mar. 22, 1988 | [JP] | Japan | 63-33176 |
| Apr. 1, 1988 | [JP] | Japan | 63-36416 |
| Apr. 1, 1988 | [JP] | Japan | 63-42993 |
| Apr. 7, 1988 | [JP] | Japan | 63-46184 |
| Apr. 7, 1988 | [JP] | Japan | 63-46185 |
| Apr. 18, 1988 | [JP] | Japan | 63-50834 |

[51] Int. Cl.⁵ ............... B32B 1/08; B32B 3/10

[52] U.S. Cl. ................ 428/36.9; 428/54; 428/195; 428/357; 428/375; 428/376; 428/378; 428/413; 428/423.1; 428/424.2; 428/424.7; 428/517; 428/520; 428/908.8; 428/922; 242/346

[58] Field of Search .......... 428/36.9, 36.91, 54, 428/357, 375, 376, 378, 922, 908.8, 413, 423.1, 424.2, 424.7, 517, 520, 195; 242/76, 197, 199, 200

[56] References Cited

U.S. PATENT DOCUMENTS

| 4,572,461 | 2/1986 | Horikawa et al. | 360/132 |
| 4,635,877 | 1/1987 | Oishi et al. | 242/197 |
| 4,934,577 | 6/1990 | Sugimoto et al. | 226/196 |
| 4,935,833 | 6/1990 | Shiba et al. | 360/132 |
| 5,074,451 | 12/1991 | Tollefson et al. | 226/196 |

*Primary Examiner*—D. S. Nakarani
*Attorney, Agent, or Firm*—Sughrue, Mion, Zinn, Macpeak & Seas

[57] ABSTRACT

A magnetic tape cassette in which critical parts subject to wear are coated with a hard coating such as an ultraviolet-cured resin. Among other effects, the generation of rubbed-off powder is reduced, thereby reducing the amount of data drop-out. Also, the case of the cassette is protected from damage.

6 Claims, 10 Drawing Sheets

MAGNETIC TAPE CASSETTE

This is a divisional of application Ser. No. 07/889,434 filed May 28, 1992, now U.S. Pat. No. 5,219,074 which is a divisional of application Ser. No. 07/799,204 filed Nov. 27, 1991 now U.S. Pat. No. 5,175,661, which is a divisional of application Ser. No. 07/697,560 filed May 9, 1991, now U.S. Pat. No. 5,101,307, which is a divisional of application Ser. No. 07/323,926 filed Mar. 15, 1989, now U.S. Pat. No. 5,041,938.

BACKGROUND OF THE INVENTION

The present invention related to a magnetic tape cassette, and more particularly to a magnetic tape cassette suited for use in a digital audio tape recorder (DAT).

Recently, cassette tape recorders have become very compact in size and lightweight, and magnetic tape cassettes of a compact size for such tape recorders have now been extensively used. In the field of audio equipment, the above-mentioned DAT has been developed (see, for example, ELECTRONICS, June 1987, pages 65-70), and this has enabled long recording and playback times of high quality and high density.

Magnetic tape cassettes, which are capable of recording and playback over a relatively wide frequency band as is the case with conventional video tape cassettes, have been developed for use in DATs. With respect to the appearance and configuration of such magnetic tape cassettes for a DAT, they are more compact in size and handier to carry than conventional audio compact cassettes.

As a result, magnetic tape cassettes for DATs tend to be carried around and used outdoors as frequently as or more frequently than conventional audio compact cassettes.

As is well known, in a DAT analog signals are converted into digital signals to effect recording. Therefore, if the magnetic tape has a minute flaw or dust is lodged thereon, signal dropout can occur. To reduce the chances of this occurring, such magnetic tape cassettes are generally provided with a special dust prevention mechanism.

In one example of such a special dust prevention mechanism, there are provided at the bottom of the cassette a slider and a lock mechanism for the slider. When the magnetic tape cassette is placed in use, the slider is moved in sliding contact with the bottom surface of the cassette half to open the lower side of an opening provided at the front side of the cassette to expose the magnetic tape so that the magnetic tape can be pulled out from the cassette and placed in contact with a magnetic head. When the magnetic tape cassette is not in use, the slider is returned, in sliding contact with the bottom surface of the cassette, to retract the magnetic tape into the cassette, that is, to its sealed condition, thus closing the lower side of the opening.

Generally, the cassette case composed of two cassette halves is made of an ABS resin and a polystyrene (PS) resin, and in most cases the slider is made of a polyoxymethylene (POM) resin. POM resin is harder than acrylonitrile butadiene styrene (ABS) resin and PS resin, and therefore if the slider is reciprocally moved repeatedly as described above over a prolonged period of time, the bottom surface of the cassette half tends to wear due to friction between the two components.

The rubbed-off powder produced as a result of this action adheres to the magnetic tape at the point where it runs on the slider, resulting in signal dropout.

In view of the above, it has conventionally been proposed to provide projections or stepped sections on the contacting surface between the cassette half and the slider to decrease the area of contact between the two in an attempt to reduce the production of such powder. With this arrangement, however, satisfactory results could not be obtained. Thus, it has been desired to provide an arrangement by which high-level recording and playback with high density recording can be maintained over a prolonged period of time.

The invention further relates to a magnetic tape cassette in which a magnetic tape wound around a pair of hubs is supported within a cassette case so that the magnetic tape can be run to effect recording and playback.

In video equipment, such as a video tape recorder or an audio tape recorder, there have been extensively used magnetic tape cassettes in which a magnetic tape wound around a pair of hubs is supported within a cassette case in such a manner that the magnetic tape can be run to effect recording and playback. Such a magnetic tape cassette when in use is loaded into a cassette loading portion of a recording and playback device, that is, a video tape recorder or an audio tape recorder. Since the magnetic tape must be disposed in proper contact with the magnetic head of the recording and playback device, it is necessary to accurately position the cassette case with respect to the cassette loading portion when the former is loaded in position into the latter.

A positioning method used, for example, with an audio magnetic tape cassette 220 will now be described with reference to FIG. 1. A cassette loading portion 205 defined by a recessed portion of a tape recorder body 201 is covered by a bucket 202 pivotally movable to one end thereof. Mounted on a chassis 206 of the cassette loading portion 205 are a pair of reel shafts 209 which are inserted in respective reel shaft insertion holes 223 of the magnetic tape cassette 220 when the cassette is loaded. Capstan 208 is also mounted on the chassis 206 and cooperates with a pinch roller 211 disposed in opposed relation thereto so as to hold the magnetic tape 224 therebetween to run the same at a constant speed. The pinch roller 211, a recording and playback head 212, and an erasing head 213 are linearly arranged on a movable chassis 210, and these components are introduced into openings 225 and 226 formed in the front end of the loaded magnetic tape cassette 220 when the movable chassis 210 is driven in the direction of an arrow A for effecting a recording and playback.

Two metal positioning pins 207a and 207b are fixedly mounted on the chassis 206 near the recording and playback head 212, the pins 207a and 207b extending in the direction of thickness of the loaded cassette.

The magnetic tape cassette 220 has positioning holes 221 and 221b disposed near the opening 225 which open in the direction of thickness of the cassette, the positioning pins 207a and 207b being adapted to be inserted into the positioning holes 221a and 221b, respectively. The magnetic tape cassette also has capstan insertion holes 222 formed near the openings 226 and opening in the direction of thickness of the cassette, the capstan 208 being loosely fitted in the capstan insertion hole 222.

Through a manual or an automatic operation, the magnetic tape cassette 220 held by the bucket 202 is angularly moved into the cassette loading portion 205 defined by the recess. At this time, the positioning pins 207a and 207b are slidingly inserted into their mating positioning holes 221a and 221b, respectively, and the capstan 208 is loosely fitted in the mating capstan insertion hole 222.

Therefore, the inner peripheral surfaces of the positioning holes 221a and 221b are rubbed by the positioning pins 207a and 207b, respectively, each time the magnetic tape cassette 220 is loaded and unloaded.

As explained above, the cassette case of the magnetic tape cassette 220 is generally molded of a resin such as an ABS resin or a PS resin because of its processability and low cost. Therefore, when the cassette case is subjected to repeated rubbing action as encountered with the inner peripheral surfaces of the positioning holes 221a and 221b, the cassette case is gradually worn because these resins are inferior in wear resistance.

As a result, the positioning holes 221a and 221b become deformed, and hence the magnetic tape cassette fails to be accurately loaded in position into the cassette loading portion, thereby adversely affecting the proper positional relation between the magnetic head and the cassette. This causes various tape running problems such as improper contact between the tape and the magnetic head, which results in an unstable reproduction output, and signal dropout due to the adhering to the magnetic tape 24 of powder produced as a result of the above rubbing action.

Further, a magnetic tape cassette for use in audio equipment, when stored, is usually contained in a magnetic tape cassette storage case made of a plastics material.

The magnetic tape cassette has openings for receiving a magnetic head, etc., of a recording and playback device, and the magnetic tape extends across these openings. The storage case prevents dust from entering the cassette during storage, protects those portions of the magnetic tape disposed in the above openings, and protects the whole of the cassette.

There are various known shapes and constructions of storage cases. Generally, the storage case has a lid having a pocket for holding the cassette, and a casing having a pair of rotation preventing lugs for insertion into respective shaft insertion holes of the magnetic tape cassette.

Pivot pins formed respectively on right and left side walls of the casing are fitted in respective holes formed through right and left side walls of the lid so that the lid and the casing can be opened and closed relative to each other similar to a door.

Further, the casing has retainer projections, and the lid has engaging holes with which the retainer projections are engaged when the lid is closed relative to the casing, thereby holding the lid against accidental opening movement.

In view of the manufacturing cost, the casing and the lid are generally made of an acrylonitrile styrene (AS) resin, PS resin, polypropylene (PP) resin or the like.

The storage case is opened and closed each time the magnetic tape cassette is placed in storage and removed therefrom. Storage cases quite often rub together during times when they are stored and carried. When the storage case is opened and closed, the pivot pins are angularly moved within their respective mating holes, and the pivot pin and the peripheral surface of the hole rub together, producing rubbed-off powder. With respect to the retainer projections and the engaging holes, a similar rubbing action occurs to further produce rubbed-off powder. Such rubbed-off powder is a fine powder and therefore is liable to be dispersed within the storage case to adhere to the surface of the magnetic tape exposed through the above-mentioned openings. As a result, recording and playback cannot be effected at those portions of the magnetic tape to which the rubbed-off powder adheres as signal dropout occurs. In the event of such signal dropout, as described in TELEVISION TECHNOLOGY, (September 1985, page 34, a Japanese journal published by Denshi Gijutsu Shuppan K. K.) picture flicking occurs and the reproduced audio is noisy.

Thus, despite the fact that the storage case of a conventional design was originally intended to protect the magnetic tape cassette and to provide dust prevention, rubbed-off powder can still be produced over long periods of time.

The above-mentioned AS, PS and PP resins have a low surface hardness (strength), and therefore when the storage cases rub together during storage and carrying, the surface thereof is susceptible to damage. An index card indicative of the contents of the recorded information is often contained within the storage case. If there are scratches on the case surface, the index card and an index bonded to the cassette surface can be obscured. Such a phenomenon is also undesirable from the viewpoint of appearance. Thus, these problems have made it quite difficult to use a storage case for a long period of time.

In view of the above, it has been proposed to provide ribs on marginal portions of the outer surface of the storage case so that the outer surfaces of the storage cases do not contact each other. However, this has been found not sufficient for the prevention of scratching. On the contrary, providing ribs reduces the area of contact between the adjacent storage cases, and therefore they are liable to slide with respect to each other. As a result, the incidence of accidental dropping and damage is increased.

Also, in magnetic tape cassettes, the magnetic tape wound on the pair of tape winding bodies is rotatably mounted within a cassette case composed of upper and lower cassette halves, each of a one-piece molded construction made of a synthetic resin.

One particular tape winding body used in a video tape cassette has upper and lower flanges formed respectively on upper and lower ends of the tape reel to prevent the lateral edges of the magnetic tape from contacting the inner surfaces of the cassette halves and also to regulate the position of winding of the tape so as to maintain even tape winding. A tape winding body of another type, such as one used in an audio tape cassette, has a pair of upper and lower friction sheets each mounted between the end face of the hub and the inner surface of the cassette half to reduce the amount of friction between the lateral edge of the magnetic tape and the inner surface of the cassette half to thereby stabilize the running of the magnetic tape and also to maintain even tape winding.

Each of the hubs is rotatably supported by respective cylindrical spool support walls formed on the upper and lower cassette halves in such a manner that the hub is prevented from moving in the horizontal direction with respect to the cassette. As a result, however, the upper and lower portions of the inner periphery of the hub are always rubbed by the corresponding spool support walls.

The flanged tape reel has a projection formed at an upper surface thereof and disposed at its axis. A metal plate mounted on the upper cassette half urges this projection inwardly of the cassette so as to limit the vertical movement of the tape reel. Further, the outer peripheral edges of the flanges of the tape reel contact the side walls of the cassette halves to limit the horizontal movement of the tape reel.

Therefore, due to vibration and shock occurring, for example, during transportation of the cassette, the outer peripheral edges of the flanges of the flanged tape reel are rubbed by the above side walls, and the outer surface of the lower flange is rubbed by the inner surface of the lower cassette half.

As already discussed, cassette cases have recently been molded of a general-purpose resin of inferior wear resistance such as ABS and PS resin because of its processability and reduced manufacturing cost. On the other hand, the tape winding bodies such as the above-mentioned hub and flanged tape reel are generally molded of a resin of high wear resistance such as a polyoxymethylene resin. Therefore, the cassette case is gradually worn.

As a result, the spool support walls are deformed, and hence the axis of rotation of the tape reel can deviate during rotation, which results in unstable running of the magnetic tape. Further, the rubbed-off powder resulting from this action adheres to the magnetic tape, causing various tape troubles such as signal dropout.

Yet further, the invention relates to a magnetic tape cassette incorporating a pad for stabilizing the running of a magnetic tape.

Magnetic tape cassettes for audio and video use are provided with guide members such as an immovable tape guide in sliding contact with the magnetic tape and a guide roller rotatably engaged with the magnetic tape to guide the running of the tape. These guide members are arranged to contact with either the backside (the base side) or the front side (the magnetic layer side) of the magnetic tape. Particularly, the rotatable guide roller is used mainly because it can avoid unnecessary frictional sliding contact with the magnetic tape. Particularly, recently high-density magnetic tapes have been used, and therefore such a rotatable guide roller has been increasingly used to avoid signal dropout caused by scuffing of the magnetic tape as a result of direct sliding contact of the magnetic tape and an immovable tape guide.

Such guide rollers are of a cylindrical shape, and some have a flange at their lower end. Generally, the guide roller is made of a plastics material having a relatively high wear resistance, such as POM resin. The magnetic tape is in sliding contact with the outer periphery of the guide roller, that is, the tape extends around the guide roller through a certain angle, and therefore the guide roller considerably influences the running of the magnetic tape. There are occasions when slippage occurs between the magnetic tape and the reels around which the tape is wound when the tape is stopped subsequent to a fast-forwarding operation to thereby displace the magnetic tape out of position. As a result, the magnetic tape can accidentally project from the tape extraction opening of the cassette, subjecting it to damage. This tendency is particularly marked in cassettes incorporating a rotatable roller.

To avoid such problems, a pad is provided within the cassette for urging the magnetic tape against the tape guide or the rotatable roller.

For example, such a pad may be molded of a plastics material, and be resilient, short and thin. The pad is fixedly secured at one end and urged into a curved configuration to have an elastic force so that the pad urges the magnetic tape against the guide roller.

Generally, the pad has a plate-like base molded of polyethylene terephthalate (PET) resin and a layer of ultra-high-molecular-weight polyethylene or Teflon formed on the base. Polyethylene terephthalate resin has the drawback that it is inferior in wear resistance. Ultra-high-molecular-weight polyethylene and Teflon though are expensive materials and therefore the pad has generally been costly because of its material cost and processing cost.

To reduce the cost, it has been proposed to provide a one-piece molded plate made solely of ultra-high-molecular-weight polyethylene. Although such a pad is superior in wear resistance with respect to sliding contact with the magnetic tape, it is inferior in resistance to creep. Therefore, there have been encountered problems such as an unstable urging force applied to the magnetic tape.

The invention yet further relates to a magnetic tape cassette having a transparent window provided in cassette case body.

The shape and appearance of audio and video magnetic tape cassettes vary depending on their use. Despite this, magnetic tape cassettes have a common feature in that they are usually provided with a transparent window for viewing the interior of the magnetic tape cassette.

The transparent window is very useful for observing the winding condition of the magnetic tape and for estimating the present recording and playback position, and it is not too much to say that a transparent window is an indispensable feature in a magnetic tape cassette.

FIG. 2 illustrates an example of a method for forming a conventional transparent window. In this method, an opening 602 serving as the window is formed at a predetermined position in an upper cassette half 601 made, for example, of an ABS resin. A stepped portion 605 stepped in the direction of the thickness of the cassette is provided around the opening 602. A plate 603 of a transparent synthetic resin having a stepped portion 606 complementary in shape to the stepped portion 605 is fusingly bonded to the edge portion of the opening 602 to form the transparent window.

The plate 603 is fusingly bonded to the edge portion of the opening 602 usually by ultrasonic bonding. More specifically, a projection or fusion rib 604 is formed on the stepped portion 606 formed on the lower surface of the plate 603. The projection 604 is brought into contact with the stepped portion 605 defining the edge portion of the opening 602, and then ultrasonic energy is applied to this contact region so that the projection 604 is fused to bond together the plate 603 and the edge portion of the opening 602.

In such ultrasonic bonding, as the area of contact between two parts to be bonded together increases, the time required to effect fusion bonding is increased, lowering the operating efficiency.

For this reason, the projection 604 serving as the fusion rib is provided. However, as a result of the provision of the projection 604, the height A used for positioning the fitting portion 607 of the plate 603 is reduced by an amount corresponding to the height of the projection 604. This makes it difficult to position the plate 603 with respect to the opening 602 when the former is fitted in the latter. In addition, when ultrasonic energy is applied to the fusion portion to effect ultrasonic bonding, the plate 603 is subjected to vibration. As a result, the shoulder of the fitting portion 607 sometime rides on the stepped portion 605 damaging the plate 603.

Although it can be considered to thicken the plate 603 in order to overcome the above problems, this is not desirable because it lowers the transparency of the window and increases the cost. In addition, since the plate 603 is subject to vibration upon application of ultrasonic energy to the fusion portion during the ultrasonic bonding, it is difficult to accurately determine the size of the opening 602. For this reason, it has been necessary to make the size of the opening larger, taking the vibration of the plate 603 into account. As a result, upon assembly, there is created a gap between the fitting portion 607 and the edge of the opening 602. Further, when the magnetic tape cassette is carried or when it is stored on a rack, the surface of the plate 603 is susceptible to damage such as by scratching, and the transparency of the window can thereby be lowered.

Thus, there is a problem in that the overall appearance of the magnetic tape cassette can readily be marred.

Moreover, the invention relates to a magnetic tape cassette having a guide member for stabilizing the running of the magnetic tape in the cassette.

Magnetic tape cassettes for audio and video use are provided with guide members such as an immovable tape guide in sliding contact with the magnetic tape and guide roller rotatably engaged with the magnetic tape to guide the running of the tape. These guide members are arranged in contact with either the backside (the base side) or the front side (the magnetic layer side) of the magnetic tape. Particularly, the rotatable guide roller is used mainly because its use avoids unnecessary frictional sliding contact with the magnetic tape.

As discussed above, such guide members are generally of a cylindrical shape, and some have a flange at its lower end or flanges at its upper and lower ends, respectively. Generally, the guide member is made of a plastics material having a relatively high wear resistance, such as a POM resin. The magnetic tape is in sliding contact with the outer periphery of the guide member, that is, the tape extends around the guide member through a certain angle, and therefore the guide member considerably influences the running of the magnetic tape. Recently, a recording and playback device as well as a magnetic tape cassette has been required to have a high performance to meet a high density recording and playback, and accordingly the guide member has been required to have an improved performance. Particularly, in video tape cassettes of the type in which recording and playback are effected digitally, the problem of the tape running has become important.

A magnetic tape cassette having the above-mentioned guide member is described, for example, in TELEVISION TECHNOLOGY, December 1986, page 45 (see, in particular, FIG. 20 of this article).

The guide member is made of a POM resin as described above. One problem is that the use of a resin of a high wear resistance such as a POM resin increases the cost of the cassette. Such a guide member of high wear resistance can be produced at a lower cost by molding a hollow or solid cylindrical body using a more inexpensive resin, and coating an ultraviolet-curing coating onto the outer peripheral surface of the cylindrical body with which the magnetic tape is to be disposed in sliding contact.

However, since the surface electrical resistance of a resin subjected to ultraviolet-curing is very high, static electricity is liable to develop when the magnetic tape is moved in sliding contact with the outer surface of the guide member. This causes a problem in that the magnetic tape is then undesirably attracted to the surface of the guide member because of the static electric charge, thus rendering the tape running unstable.

SUMMARY OF THE INVENTION

An object of the invention is to overcome the above-discussed problems and to provide a magnetic tape cassette in which the amount of wear of the cassette half due to the sliding movement of the slider is significantly reduced, thereby achieving an excellent dust prevention effect.

The above object of the present invention is achieved by a magnetic tape cassette wherein a magnetic tape wound around a pair of hubs is supported in a hollow interior of a cassette comprising upper and lower cassette halves in such a manner that the magnetic tape can run therein, part of the magnetic tape being pulled exteriorly of the cassette through an opening provided at a front side of the cassette and constituting part of a path of travel of the magnetic tape, wherein there is provided a slider slidingly movable along a bottom surface of the lower cassette half in forward and rearward directions with respect to the cassette so as to open and close a lower side of the opening, a plurality of ribs for reducing the coefficient of friction are formed on the outer surface of the lower cassette half with which the slider is disposed in aligning contact, the ribs extending in the direction of sliding movement of the slider, and hard coatings for reducing wear due to the sliding movement of the slider are formed on surfaces of the ribs.

Objects of the invention are also achieved by a magnetic tape cassette wherein positioning holes are provided for positioning the cassette when the cassette is to be loaded into a recording and playback device, and a magnetic tape wound around a pair of hubs is supported within a cassette case so that the magnetic tape can run so as to effect recording and playback, wherein hard coatings for reducing wear due to sliding movement are formed on inner peripheral surfaces of the positioning holes.

More specifically, hard coatings made, for example, of ultraviolet-cured resins are formed on the inner peripheral surfaces of the positioning holes. With this arrangement, even if the cassette case is made entirely of a general-purpose having a low wear resistance such as an ABS resin, and even when the positioning pins of metal rub the inner peripheral surfaces of the positioning holes, the wear of the inner peripheral surfaces of the positioning holes is reduced because of the formation of the hard coatings of high wear resistance thereon.

A further object of the present invention is to provide a magnetic tape cassette storage case which is resistant to damage and which provides an improved dust prevention effect.

This object is achieved by forming a hard coating on a surface of a storage case, and particularly on a transparent or semi-transparent surface thereof through which an index card or the like is visible, and also by forming hard coatings on pivotal portions for a casing and a lid and those portions near the pivotal portions.

More specifically, the storage case itself is made of an AS resin, a PS resin or a PP resin, and the hard coatings are formed on those surfaces of the storage case susceptible to damage as well as those portions liable to produce rubbed-off powder. Therefore, the hardness of those portions on which the hard coatings are formed is increased, and surface damage as well as the production of rubbed-off powder resulting from the rubbing of the pivotal portions are eliminated.

Yet another object of the invention is to overcome the above problems and to provide a magnetic tape cassette in which wear at the portions of the cassette case and the tape winding body in contact with each other are prevented, and the cassette has good magnetic recording characteristics and can be manufactured at a lower cost.

This object is achieved by a magnetic tape cassette wherein tape winding bodies on which a magnetic tape is wound are housed in a cassette case wherein a hard coating is formed on one or both contact portions of each tape winding body and the cassette case, the tape winding body contacting part of the cassette case.

More specifically, hard coatings made, for example, of an ultraviolet-curing resin, are formed on the surfaces of the above contact portions. With this construction, even if the cassette case is made entirely of a general-purpose resin of a low wear resistance such as an ASB resin, when the tape winding bodies rub the cassette case, the wear of the cassette case is reduced since the surfaces of the above contact portions are protected by the respective hard coating layers of a high wear resistance.

Yet another object of the invention is to provide a magnetic tape cassette incorporating a pad for stabilizing the running of the magnetic tape, which pad can be manufactured at a lower cost but which has an increased wear resistance, thereby ensuring stable running of the magnetic tape.

This object is achieved by a magnetic tape cassette rotatably housing a pair of hubs on which a magnetic tape is wound, wherein a resilient pad, which is held in sliding o contact with the magnetic tape and urges the magnetic tape so as to stabilize the running of the magnetic tape, has a hard coating of an ultraviolet-curing resin formed on a portion thereof which is in contact with the magnetic tape.

More specifically, the resilient pad comprises a plate-like base made of an inexpensive synthetic resin such as a PET resin, and the hard coating is formed on the portion of the pad disposed in contact with the magnetic tape, using the ultraviolet-curing resin. Thus, a resilient pad having an excellent wear resistance is provided using inexpensive materials, and the pad can be manufactured by a simple process. Therefore, the manufacturing cost of the pad can be reduced.

A still further object of the invention is to overcome the above problems and to provide a magnetic tape cassette incorporating a transparent window which is resistant to damage and which can easily be mounted on the cassette.

This object is achieved by a magnetic tape cassette comprising upper and lower cassette halves defining a hollow cassette case within which a magnetic tape wound on a pair of hubs is mounted so that the magnetic tape can run, the upper cassette half having a transparent window at an upper wall thereof, wherein the transparent window comprises a transparent synthetic resin plate sealing an opening formed through the upper wall of the upper cassette half, and the synthetic resin plate is bonded to an edge portion of the opening by an ultraviolet-cured resin formed therebetween.

More specifically, the curing of the ultraviolet-cured coating is carried out by ultraviolet radiation. The invention has been made in view of the fact that the synthetic resin plate is transparent and therefore allows ultraviolet to transmit therethrough. With this construction, there is no need to form a fusion rib on the synthetic resin plate, and also there is no need to apply ultrasonic energy thereto. Therefore, the positioning of the synthetic resin plate is facilitated.

One more object of the invention is to provide a magnetic tape case incorporating a guide member capable of preventing a static electric charge caused by a sliding contact of the magnetic tape therewith and of ensuring stable running of the magnetic tape.

This object is achieved by a magnetic tape cassette incorporating a guide member disposed in sliding contact with a magnetic tape for stabilizing the running of the magnetic tape, wherein the guide member comprises a hollow or solid cylindrical body molded of a synthetic resin, an antistatic ultraviolet-cured coating of a low electrical resistance, and a high-hardness ultraviolet-cured coating, both of which coatings are formed on an outer peripheral surface of the cylindrical body in an intermingled manner in the form of stripes extending generally along the axis of the cylindrical body.

The static charge produced as a result of the sliding contact between the magnetic tape and the high-hardness ultraviolet-cured coating is discharged through the antistatic ultraviolet-cured coating disposed adjacent the high-hardness ultraviolet-cured coating. Therefore, the magnetic tape will not be attracted to the guide member. Also, the hardness (wear resistance) of the guide member is increased, thereby ensuring stable running of the magnetic tape over a prolonged period of time.

DESCRIPTION OF THE PREFERRED EMBODIMENT

Preferred embodiments of the present invention will now be described in detail with reference to the drawings.

Figure 1:
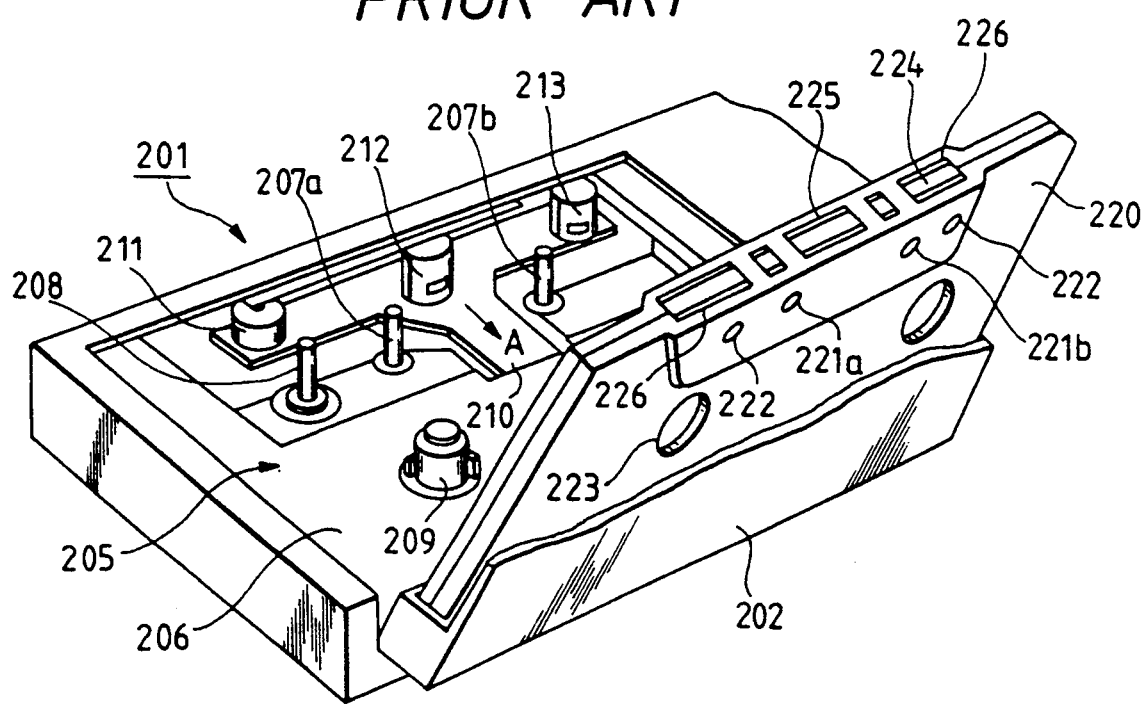
FIG. 1 is a perspective view of an important portion of a tape recorder showing a loading operation of a magnetic tape cassette.
Figure 2:
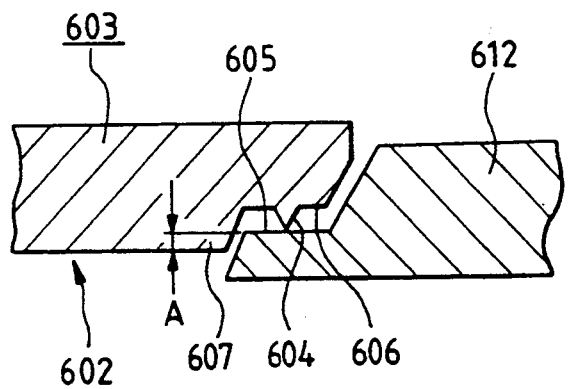
FIG. 2 is a fragmentary cross-sectional view of a conventional magnetic tape cassette showing a transparent window construction.
Figure 3:
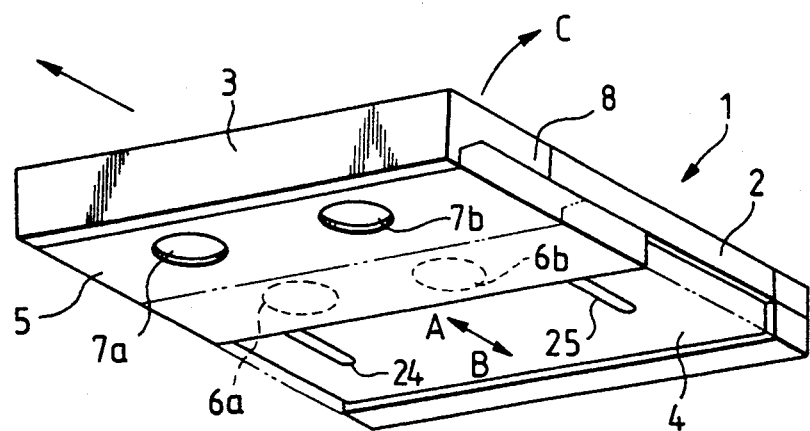
FIG. 3 is a view showing the appearance of a magnetic tape cassette as viewed from a bottom side thereof.

FIG. 3 is a view showing the appearance of a magnetic tape cassette 1 embodying the present invention, particularly, showing a bottom side thereof.

When the magnetic tape cassette 1 is not in use, a guard panel 3 attached to a front portion of an upper cassette half 2, that is, the loading side of the cassette relative to the DAT (not shown), is in its closed position, and a slider 5 which is reciprocally movable in directions of arrows A and B along the bottom surface of a lower cassette half 4 is lockingly held at the above front portion by a lock mechanism (not shown).

In this condition, a pair of reel shaft insertion holes 6a and 6b formed through the lower cassette half 4 are not disposed in alignment with the respective reel shaft insertion holes 7a and 7b formed through the slider 5. Therefore, the cassette halves 2 and 4, the guard panel 3, and the slider 5 jointly provide a dust prevention assembly for a magnetic tape (not shown) wound around a pair of hubs (not shown).

When the magnetic tape cassette 1 is loaded into a DAT, that is, in use, the slider 5 is caused to move in the direction of an arrow B to its stop position where the reel shaft insertion holes 7a and 7b are disposed in alignment with the reel shaft insertion holes 6a and 6b, respectively, so that a pair of reel shafts (not shown) are passed through these two pairs of aligned holes to drive the pair of hubs for rotation.

At this time, the guard panel 3 is rotated upwardly, that is, in the direction of an arrow C, about pivot pins 8 passing through the upper half cassette 2 at opposite sides thereof. As a result, an opening or mouth portion 9 of the magnetic tape cassette 1 (FIG. 4) is opened, so that the magnetic tape is exposed at the front side of the cassette and is pulled out by a recording/playback device for contact with a magnetic head.

Figure 4:
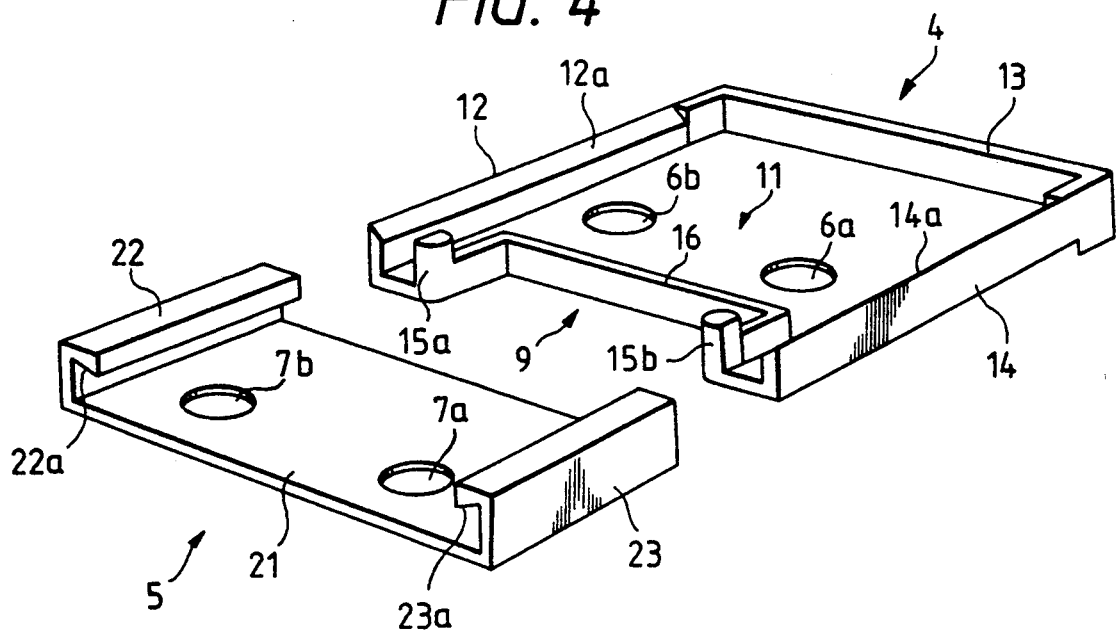
FIG. 4 is a perspective view showing a lower cassette half and a slider.

Next, the sliding structure of the slider will be described with reference to FIGS. 4 and 5.

The lower cassette half 4 is of a box-like configuration defined by a lower base 11, walls 12, 13 and 14 formed on three respective sides of the lower base 11 in a surrounding relation thereto, and a wall 16 having a generally U shape when viewed from the top of the lower cassette half. The upper edges of the walls 12 and 14 are inclined toward each other, and these inclined surfaces 12a and 14a serve as guide portions for the slider 5.

The slider 5 is defined by a flat portion 21 and guide portions 22 and 23. The guide portions 22 and 23 have inclined surfaces 22a and 23a, respectively, which are in sliding contact with the inclined surfaces 12a and 14a, respectively.

Figure 5:
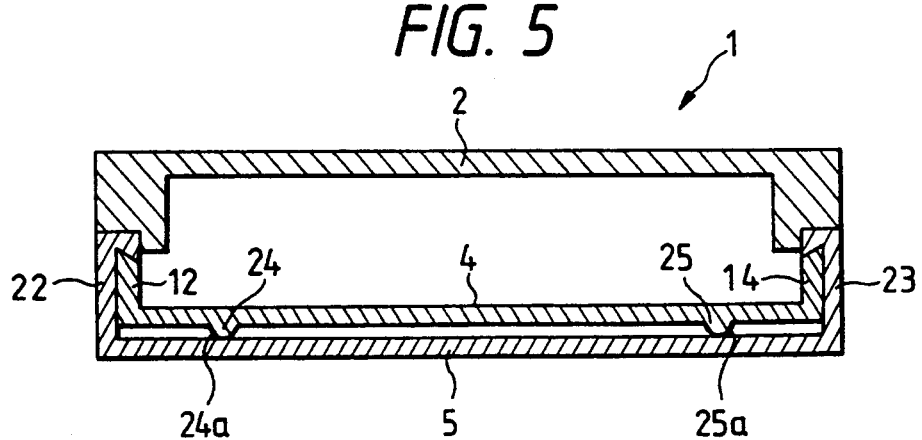
FIG. 5 is a cross-sectional view of an important portion of a magnetic tape cassette.

As shown in FIGS. 3 and 5, two ribs 24 and 25 of a semi-circular cross-section are formed on the bottom surface of the lower cassette half 4. The ribs 24 and 25 are provided for the purpose of decreasing the area of contact between the slider 5 and the bottom surface of the lower cassette half 4 when the slider is slidingly moved in the directions of arrows A and B, thereby rendering this sliding movement smooth and reducing the production of the above-mentioned rubbed-off powder.

However, the provision of only the ribs 24 and 25 is not sufficient, and therefore in this embodiment ultraviolet-cured coatings 24a and 25a are formed on the surfaces of the ribs 24 and 25, respectively. The ultraviolet-cured coatings 24a and 25a can be formed by applying to the surfaces of the ribs 24 and 25 an ultraviolet-curing agent such as one of the unsaturated polyester type, the unsaturated urethane-acrylate type, the unsaturated epoxy-acrylate type, the unsaturated polyester-acrylate type or the like, and then applying ultraviolet to the coated agent to effect surface curing.

As a result, the lower cassette half 4 as well as the upper half cassette 2 can be made of an ABS resin or a PS resin, while the ribs 24 and 25 have a high surface hardness and an increased wear resistance. Therefore, even if the slider 5, which is made of a POM resin, is slidingly moved repeatedly over the ribs 24 and 25 for a prolonged period of time, very little rubbing wear of the ribs will occur because of their increased wear resistance. In other words, rubbed-off powder will hardly be produced, and therefore there is hardly any powder to adhere to the magnetic tape. Therefore, little or no signal dropout will occur. Thus, almost perfect dust prevention measures are achieved.

In addition to the above-mentioned portions, the dust prevention measures achieved by the ultraviolet-cured coatings 24a and 25a can also be applied to those portions near the path of travel of the magnetic tape, thereby further enhancing the dust prevention effect.

Figure 6:
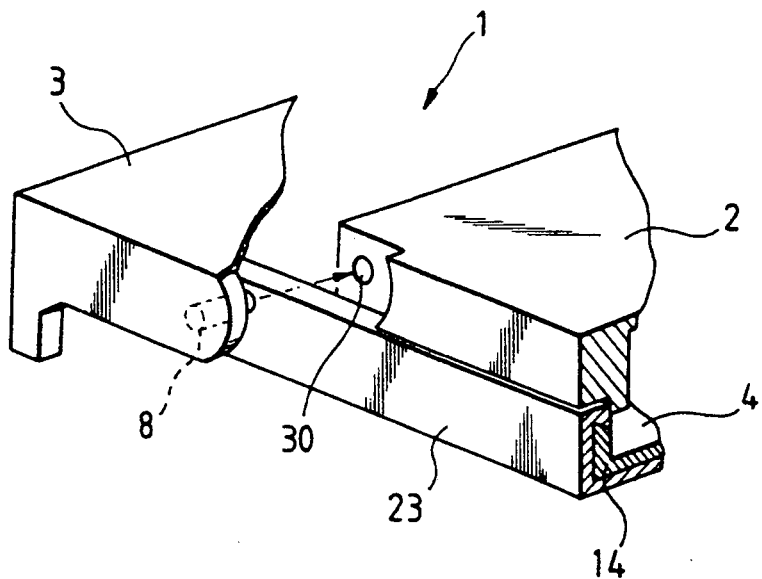
FIG. 6 is a partly broken away perspective view of the magnetic tape cassette of FIG. 5.

For example, the guard panel 3 is angularly movably mounted on the upper cassette half 2 by the pivot pins 8 each passing through a respective one of apertures 30 formed in the upper half cassette, as shown in FIG. 6, and with this arrangement rubbed-off powder is liable to be produced since the pivot pins 8 and the inner surfaces of the apertures 30 rub together. Moreover, the apertures 30 are disposed in the vicinity of the mouth portion 9 and hence near the running magnetic tape.

Therefore, there is a great risk that the rubbed-off powder from the inner surfaces of the apertures 30 will adhere to the magnetic tape. To prevent this, the above-mentioned ultraviolet-cured coating can be formed on the inner surface of each aperture 30. Thus, by forming ultraviolet-cured coatings on those portions which are liable to produce rubbed-off powder, the dust prevention effect can be markedly improved, thereby enhancing the reliability of the magnetic tape cassette.

Although the above embodiment relates to an audio magnetic tape cassette, the invention is, of course, applicable to video magnetic tape cassettes.

In the invention as described above, the plurality of ribs for sliding contact with the slider are formed on the bottom surface of the lower cassette half of the magnetic tape cassette so as to reduce the coefficient of friction, and the hard coatings cured by ultraviolet are formed on the surfaces of these ribs. As a result, the lower cassette half will not suffer rubbing damage by the slider when the latter is slidingly moved so that rubbed-off powder never adheres to the magnetic tape. This enhances the dust prevention effect and maintains a good sliding movement of the slider over a prolonged period of time.

Further, according to the present invention, the cassette case can be made of a material which is inexpensive and can be easily molded, such as an ABS resin and a PS resin. Therefore, there can be obtained a magnetic tape cassette of high performance having an excellent dust prevention effect, and which can be manufactured at a low cost.

Figure 7:
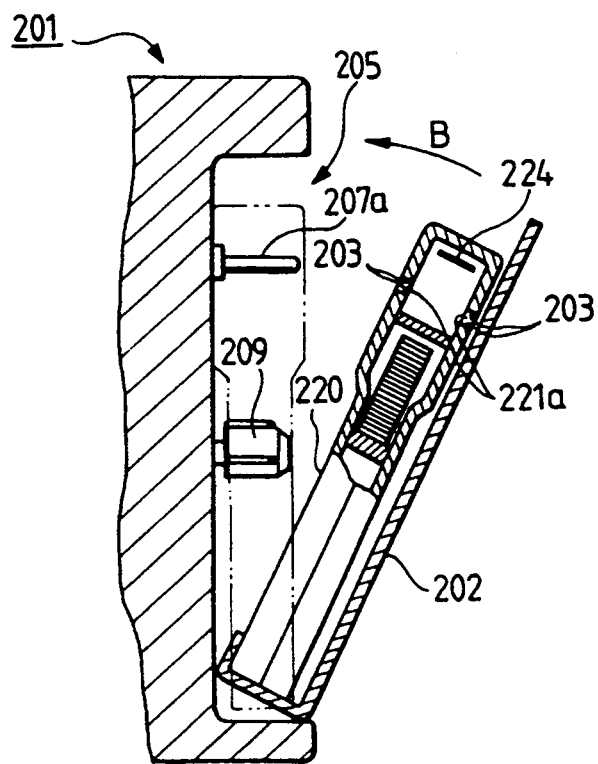
FIG. 7 is a fragmentary cross-sectional view showing a loading operation of a preferred embodiment of a magnetic tape cassette of the present invention.

FIG. 7 is a fragmentary cross-sectional view showing a loading operation of a magnetic tape cassette 220 of a second embodiment of the present invention.

The magnetic tape cassette 220 has two positioning holes 221a and 221b disposed at a front portion thereof and opening in the direction of the thickness of the cassette. Ultraviolet-cured coatings 203 are formed on the inner peripheral surfaces of the positioning holes 221a and 222a.

When the magnetic tape cassette 220 is loaded into a magnetic tape loading portion 205 of a tape recorder body 201, the cassette is inserted into a bucket 202, and then the bucket 202 is angularly moved in the direction of an arrow B together with the magnetic tape cassette 220, as is the case with a conventional cassette.

At this time, positioning pins 207a and 207b, formed on the magnetic tape loading portion 205 in a projecting manner, are inserted into the positioning holes 221a and 221b, respectively.

The positioning pins 207a and 207b are inserted into the respective positioning holes 221a and 221b in such a manner that the holes 221a and 221b are disposed in inclined relation to the axes of the pins 207a and 207b, respectively. Therefore, the positioning pins 207a and 207b are inserted through the positioning holes 221a and 221b, respectively, in such a manner the pins 207a and 207b rub the inner peripheral surfaces of the holes 221a and 221b, respectively. After this inserting operation is completed, the positioning pins 207a and 207b are disposed coaxially with the positioning holes 221a and 221b, respectively.

In the present invention, however, the ultraviolet-cured coatings 203 are formed on the inner peripheral surfaces of the positioning holes 221a and 221b, respectively, and therefore the thus-coated inner peripheral surfaces are not easily worn. Accordingly, even when these inner peripheral surfaces are rubbed by the positioning pins 207a and 207b, they are hardly subjected to wear, and powder resulting from such rubbing is hardly produced.

The ultraviolet-cured coatings 203 are formed by applying to the inner peripheral surfaces of the positioning holes 221a and 221b an ultraviolet-curing agent such as one of the unsaturated polyester type, the unsaturated urethane-acrylate type, the unsaturated epoxy-acrylate type and the unsaturated polyester-acrylate type, and then applying ultraviolet to the coated agent to effect the surface curing. Therefore, the cassette case can be molded, using conventionally-employed resin and molding method, and then the ultraviolet-cured coatings 203 can be formed on the above-mentioned inner peripheral surfaces. Thus, the cassette can be easily manufactured.

Therefore, in the above embodiment, wear of the positioning holes can be prevented, and production of the powder resulting from the rubbing can be reduced. Hence, there is provided a magnetic tape cassette which has good magnetic recording characteristics and which can be manufactured at low cost.

Based on the principles of the present invention, the application of the ultraviolet-cured coatings 203 is not limited to the positioning holes 221a and 221b, and such coating can be applied to the capstan insertion holes 222, the openings 225 and 226. Further, the application of the invention by which prevention of the rubbing-off of the cassette material through the use of ultraviolet-cured coatings is not limited to audio magnetic tape cassettes as in the above embodiment, but can also be extensively applied to a video cassette, a floppy disc cartridge and the like.

In the magnetic tape cassette according to this embodiment of the present invention, the hard coatings for reducing wear are formed on the inner peripheral surfaces of the positioning holes which serve to perform a positioning function when the cassette is loaded into the recording and playback device. With this arrangement, the deformation of the positioning holes as well as the production of the powder resulting from rubbing can be reduced. Therefore, such rubbed-off powder, which causes various troubles such as signal dropout due to the adhering of such powder to the magnetic tape, is not produced, and therefore the magnetic recording characteristics of the magnetic tape cassette can be improved.

Further, the cassette case of the magnetic tape cassette is made of a material which can be produced at low cost such as an ABS resin, and the cassette case is hardened at the necessary portions thereof. Therefore, the manufacturing cost can be greatly reduced as compared to a cassette made entirely of a specially cured resin, and an inexpensive magnetic tape cassette can be provided.

A third preferred embodiment of the present invention will now be described in detail.

Figure 8:
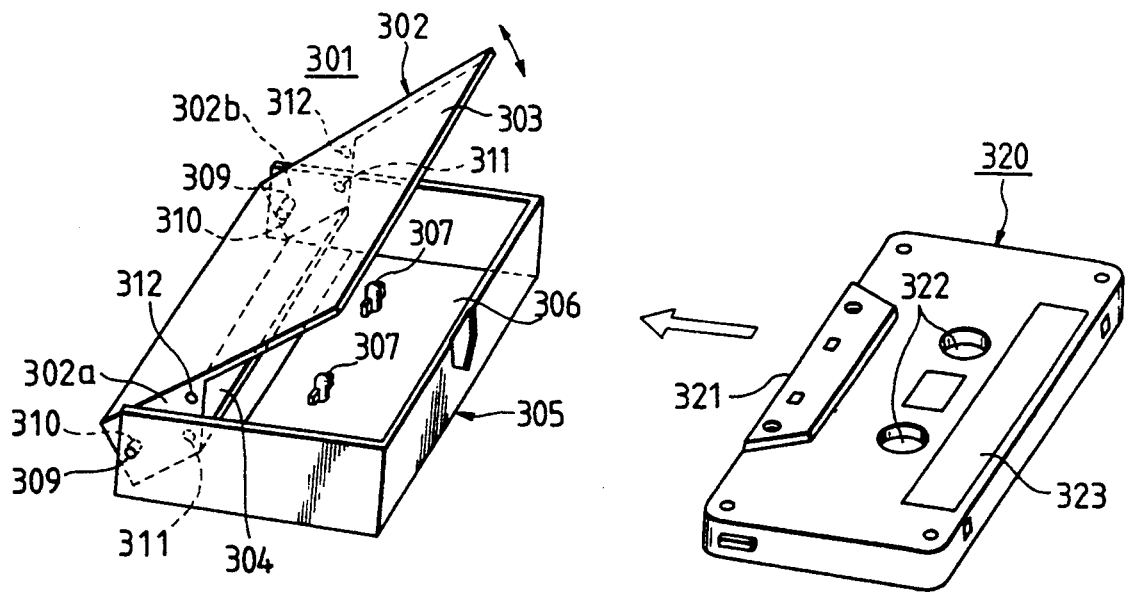
FIG. 8 is a view showing the appearance of another preferred embodiment of a cassette storage case of the present invention showing the cassette storage case and a magnetic tape cassette to be stored in the storage case.

FIG. 8 is a perspective view showing a storage case 301 embodying the invention and a magnetic tape cassette 320 to be stored in the storage case 301.

The storage case 301 includes a lid 302 having a pocket 304 into which the magnetic tape cassette 320 is adapted to be inserted, and a casing 305 having a pair of rotation prevention lugs 307 for insertion into respective shaft insertion holes 322 of the magnetic tape cassette 320. Pivot pins 309 are formed on inner surfaces of right and left side walls of the casing 305, and are fitted respectively in holes 310 formed through right and left side walls of the pocket 304. With this arrangement, the casing 305 and lid 302 of the storage case 301 can be opened and closed with respect to each other in the manner of a door.

Projections 311, each having a semi-spherical end, are also formed on respective inner surfaces of the right and left walls of the casing 305, and are adapted to be fitted in engaging holes 312 formed through the right and left walls of the pocket 304 when the lid and the casing 305 are in the closed condition.

When the magnetic tape cassette 320 is to be stored in the storage case 301, the magnetic tape cassette 320 is inserted into the pocket 304 in a direction indicated by an arrow, and then the lid 302 is angularly moved toward the casing 305 to close the storage case.

As a result, the magnetic tape cassette 320 is interposed between a wall 303 of the lid 302 and a wall 306 of the casing 305 in such a manner that a thickened portion 321 (i.e., the front portion) of the magnetic tape cassette 320 having openings at one end thereof is received within the pocket 304, with the rotation prevention lugs 307 received respectively in shaft insertion holes 322 of the magnetic tape cassette 320.

In this stored condition (in which no index card is present), an index 323 bonded to the surface of the magnetic tape cassette 320 can be seen through the wall 303. However, if the wall 303 is subjected to damage due to rubbing or the like, the index 323 cannot be easily seen, which is further undesirable from the viewpoint of appearance.

Figure 9:
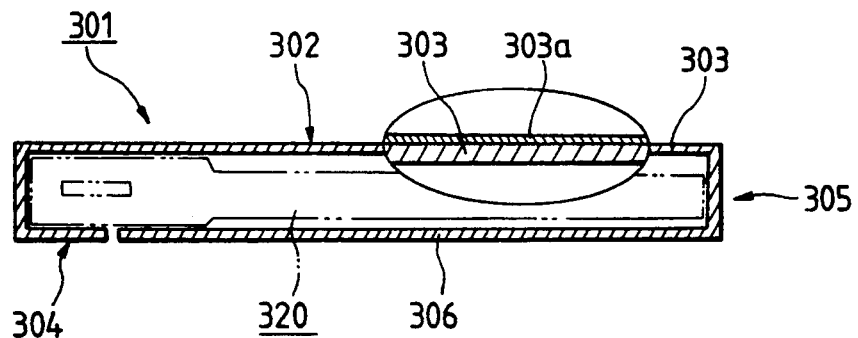
FIG. 9 is a cross-sectional view of an important portion of the storage case showing a hard coating on a lid.

Therefore, in this embodiment of the present invention, an ultraviolet-cured coating 303a is formed on an outer surface of the wall 303 to harden the surface of the wall 303, as shown on an enlarged scale in FIG. 9. As a result, even if the lid 302 and the casing 305 are made of an AS resin, a PS resin or a PP resin, which possess good processability and are inexpensive, the wall 303, which is the easiest part to damage, is rendered resistant to damage. Therefore, the index 323 bonded to the magnetic tape cassette 320 remains clearly visible, and the appearance of the cassette will not be degraded. In the case where an index card (not shown) is provided internally of the lid 302, the index 323 is viewed through the wall 306. Therefore, in this case, an ultraviolet-cured coating 303a is similarly formed on the outer surface of the wall 306 as described above for the wall 303.

Figure 10:
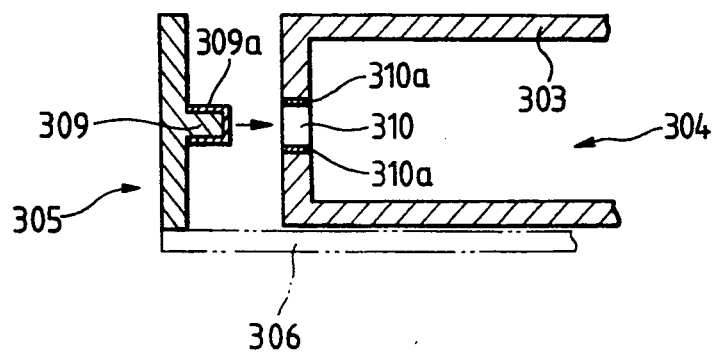
FIG. 10 is a cross-sectional view of an important portion of the storage case showing hard coatings formed on a pivot pin and a hole.

Also, as shown in FIG. 10, ultraviolet-cured coatings are formed on the pivotal portion constituted by the pivot pin 309 and hole 310 engaged with each other. More specifically, the ultraviolet-cured coating 309a is formed on the surface of each pivot pin 309, and the ultraviolet-cured coating 310a is formed on the inner surface of each hole 310.

Although in FIG. 7, the pivot pin 309 does not extend through the hole 310 for illustration purposes, the former extends through the latter in the assembled condition so that the lid 302 and the casing 305 are angularly movable about the pivot pins 309 relative to each other in the manner of a door to open and close the storage case, as described above with reference to FIG. 8. Therefore, by virtue of the provision of the ultraviolet-cured coatings 309a and 310a, the materials of the lid 302 and the casing 305, such as an AS, PS or PP resin, will not rub together even when the pivot pin 309 is passed through the hole 310. Further, due to the provision of the ultraviolet-cured coatings 309a and 310a, their surfaces which together are hardened so that the production of rubbed-off powder of the resin constituting the storage case is prevented.

Figure 11A:
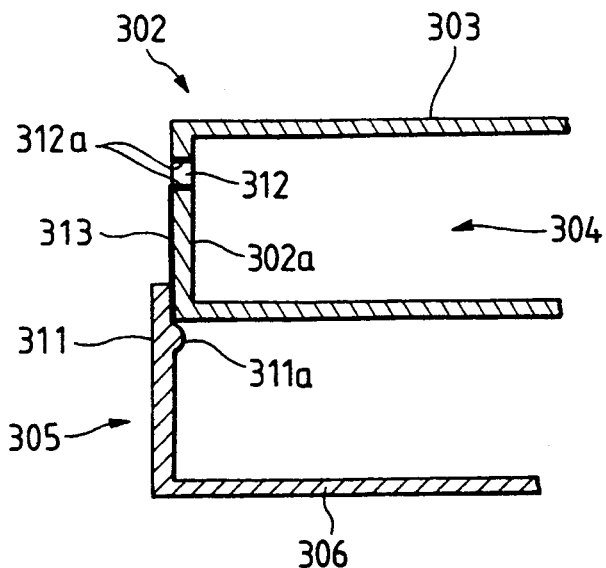
FIGS. 11A-11C are cross-sectional views of important portions of the storage case showing hard coatings formed on a projection and an engaging hole.
Figure 11B:
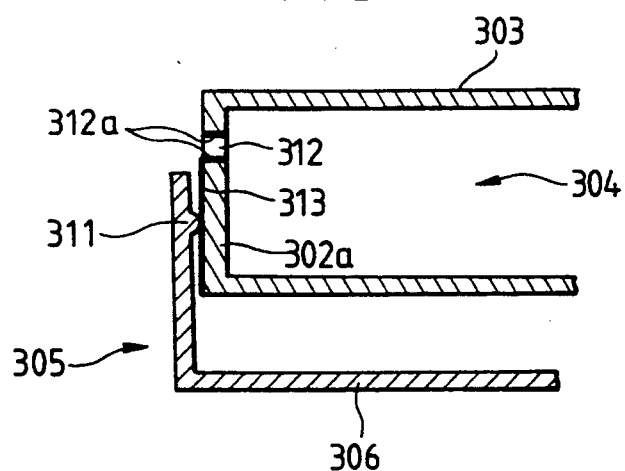
Figure 11C:
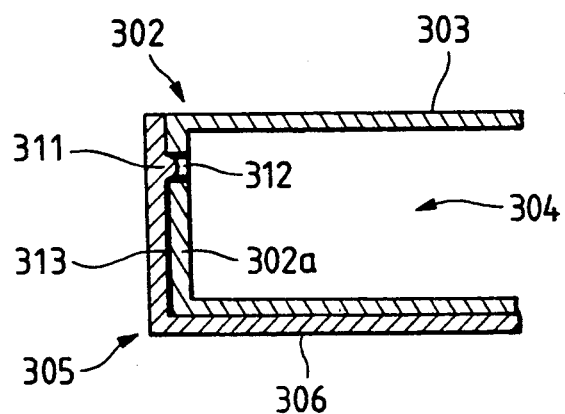

The engagement of the projection 311 with the engaging hole 312 is carried out in the order shown in FIGS. 11A, 11B and 11C. These portions are suitably subjected to surface hardening treatment to prevent dust generation. More specifically, as shown in these figures, an ultraviolet-cured coating 311a is formed on the surface of each projection 311, and an ultraviolet-cured coating 312a is formed on the inner peripheral surface of each engaging hole 312. Further, an ultraviolet-cured coating 313 is formed on that surface of each of the left and right side plates 302a and 302b over which a respective one of the projections 311 slidingly moves when the storage case is opened and closed. More specifically, concerning the side plate 302a, the ultraviolet-cured coating 313 is formed on that surface thereof extending from a region where the projection 311a is brought into contact with this side wall to a region where the hole 312 is provided.

Therefore, when the lid 302 and the casing 305 are to be closed relative to each other, the projection 311 rides over the ultraviolet-cured coating 313 as shown in FIGS. 11A and 11B. Then, the projection 311 slidingly moves over the surface of the side wall 302a toward the engaging hole 312. At this time, since the ultraviolet-cured coatings 311a and 313 are interposed between the projection 311 and the side plate 302a, rubbed-off powder is hardly produced even if this sliding movement is effected under a relatively great force.

On the other hand, when the lid 302 and the casing 305 are completely closed relative to each other, the projection 311 is fully fitted in the engaging hole 312 as shown in FIG. 11C. At this time, the projection 311 is press-fitted in the engaging hole 312 under the resilience of the side plate of the casing 305. As a result, the lid 302 and the casing 305 are held together in a unitary fashion. The holding force will not be released unless an external force such as a force applied by the fingers is exerted on the storage case, thereby enhancing the protective function of the storage case.

As described above, the ultraviolet-cured coating 311a is formed on the distal end portion of each projection 311, and the ultraviolet-cured coating 312a is formed on the inner peripheral surface of each engaging hole 312. Therefore, neither the projection 311 nor the engaging hole 312 is worn, thus producing no rubbed-off powder when the former is fitted in the latter. The pivot pins 309, through-holes 310, projections 311, and engaging holes 312 are disposed near the openings of the magnetic tape cassette 320 when the magnetic tape cassette is inserted into the pocket 304. Therefore, if the production of such rubbed-off powder is not prevented, the rubbed-off powder would adhere to the magnetic tape. In this embodiment of the present invention, however, such rubbed-off powder is not produced, and therefore one of the fundamental reasons for the dust generation is eliminated. The above-mentioned ultraviolet-cured coatings can be formed by applying a ultraviolet-curing agent to those portions on which the coatings are to be formed, and then subjecting the thus-coated agent to ultraviolet radiation. In this embodiment, the lid 302 and the casing 305 can both be transparent so that the direction of radiation of the ultraviolet is not limited, which advantageously simplifies the manufacturing process.

Further, the above ultraviolet-cured coating may be applied to other portions subjected to frequent abrasion, such as the rotation preventing lugs 307.

Further, instead of applying the ultraviolet-cured coating to one of the surfaces of the walls 303 and 306, this coating may be applied to the opposite surfaces of each of these walls. In this case, the problem of appearance is fully overcome, and the index 323 can be clearly seen from either side as desired. Further, the hard coating may be formed on the whole of the storage case 301.

In the above embodiment, although the pivot pins 309 and the projections 311 are formed on the casing 305 while the holes 310 and the engaging holes 312 are formed through the lid 302, the holes 310 and the engaging holes 312 may be formed through the casing 305 while the pivot pins 309 and the projections 311 are formed on the lid 302. In either case, the objects of the present invention can be fully achieved by providing the ultraviolet-cured coatings in the manner mentioned above.

Although the above embodiment has been described with reference to a storage case for an audio magnetic tape cassette, the invention is not restricted to such an embodiment, and can be extensively applied, for example, to a video magnetic tape cassette storage case composed of the above-mentioned plastics resins and also to a storage case for 3.5 -inch floppy disks.

As described above, according to the present invention, by forming hard coatings on the surface of the wall of the casing of the magnetic tape cassette storage case and the surface of the wall of the lid, the wear resistance of these wall surfaces is enhanced, and the appearance of the cassette will not be marred even if the storage case is made of an inexpensive material and used over a prolonged period of time.

Further, by forming the hard coatings on the support portions for angularly movably supporting the casing and lid constituting the storage case and also on the retaining portions for retaining the casing and the lid relative to each other, the wear resistance of these support portions and retaining portions is enhanced, and rubbed-off powder is not produced to thereby improve the dust prevention effect of the storage case.

Another preferred embodiment of the present invention will now be described in detail with reference to the drawings.

Figure 12:
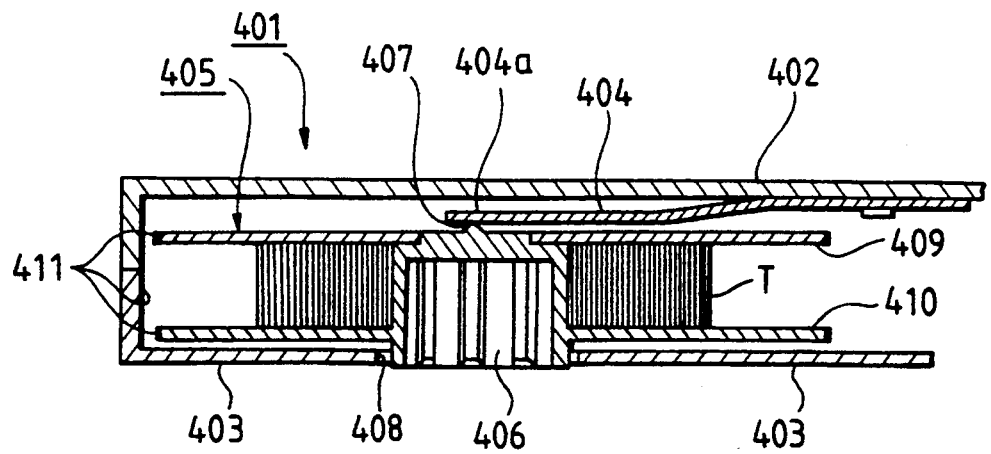
FIG. 12 is a cross-sectional view of an important portion a video magnetic tape cassette according to a further embodiment of the present invention.
Figure 13:
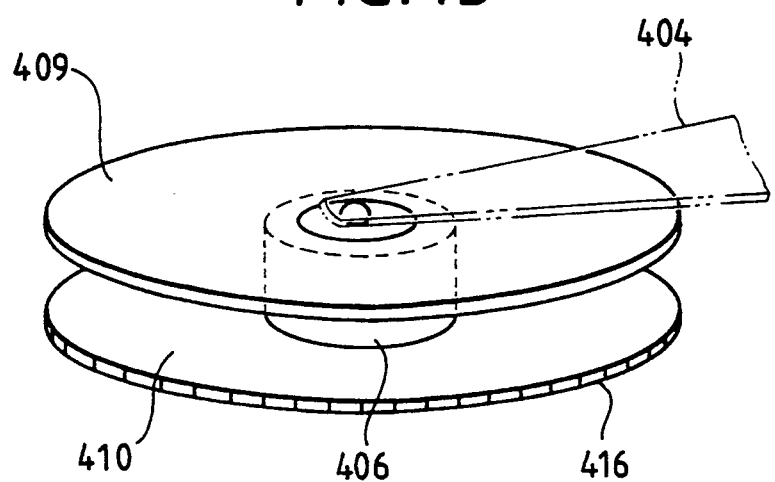
FIG. 13 is a perspective view of a portion of the video magnetic tape cassette of FIG. 12.

FIG. 12 is a cross-sectional view of an important portion of a video magnetic tape cassette.

The magnetic tape cassette 401 includes upper and lower cassette halves 402 and 403, each of one-piece molded construction made of an ABS resin. A pair of flanged tape reels 405 on which a magnetic tape T is wound are housed in the space defined by the upper and lower cassette halves.

A leaf spring 404 is secured to an inner surface of the upper cassette ball 402 at a central portion thereof. The distal end 404a of the leaf spring 404 urges a pivot 407 inwardly of the cassette which pivot is formed on an upper surface of the tape reel 405 and disposed at the axis thereof.

An opening 408 is formed through a base wall of the lower cassette half 403 for inserting a drive shaft (not shown) into a reel hub 406 therethrough to drive each tape reel 405.

Ultraviolet-cured coatings 411 are formed on the outer peripheral edges of flanges 409 and 410 of the tape reel 405, an inner surface of the side wall of the cassette case, the pivot 407 and the inner surface of the lower cassette half defining the inner surface of the bottom of the cassette case.

Due to vibration or other movement developing, for example, during transportation of the magnetic tape cassette 401, the outer peripheral edges of the flanges 409 and 410 of the tape reel 405 and the side wall of the cassette case slidingly contact each other and rub together, and the outer surface of the lower flange 410 and the above inner surface of the lower cassette half 403 slidingly contact each other and rub together.

According to the present invention, however, because the ultraviolet-cured coating 411 is formed on at least one of each mating contact surfaces, wear resistance is imparted thereto.

The pivot 407 always slidingly contacts the leaf spring 404 during the rotation of the tape reel 405 so that rubbed-off powder is liable to be produced. To prevent this, the ultraviolet-cured coating 411 is also formed on the surface of the pivot 407 so as to prevent the production of such rubbed-off powder.

In a video magnetic tape cassette, a locking pawl (not shown) is adapted to be lockingly engaged with a continuous serration 416 formed on the outer periphery of the lower flange 410 to prevent the tape reel 405 from inadvertent rotation when the cassette is not in use. When the locking pawl is moved into and out of locking engagement with the serration, rubbed-off powder tends to be produced. The formation of the above-mentioned ultraviolet-cured coating on one or both of the serration 416 and the locking pawl will prevent the above dropout problem more positively.

The upper flange 409 is usually made of a transparent resin so that the remainder of the magnetic tape can be viewed from the outside of the cassette through a transparent window formed at the upper cassette half 402. Therefore, if the surface of the upper flange 409 is subjected to damage due to contact with the upper cassette half 402 or the magnetic tape T, the visibility through the upper flange is affected. By forming ultraviolet-cured coatings 411 on the opposite sides of the upper flange 409, the surfaces of the upper flange 409 is protected from damage, which is also desirable from the viewpoint of the appearance.

Figure 14:
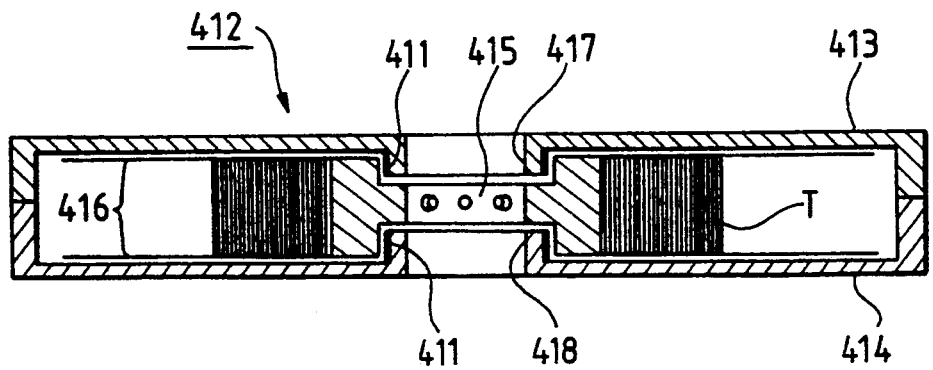
FIG. 14 is a cross-sectional view of an important portion of an audio magnetic tape cassette according to another embodiment of the present invention.

An audio magnetic tape cassette according to another embodiment of the present invention will now be described in detail with reference to FIG. 14.

The audio magnetic tape cassette 412 includes upper and lower cassette halves 413 and 414, each of a one-piece molded construction made of an ABS resin. A pair of hubs 415 on which a magnetic tape T is wound are rotatably mounted through friction sheets 416 in a spaced defined by the upper and lower cassette halves.

More specifically, each of the annular hubs 415 is rotatably supported by spool support walls 417 and 418 of a circular cross-section formed respectively on the upper and lower cassette halves 413 and 414.

The magnetic tape T is wound around each reel hub 415. The reel hub 415 is not provided with flanges, and instead the pair of upper and lower friction sheets 416 prevent the magnetic tape T from being displaced in the vertical direction.

Usually, the friction sheets 416 are fixedly mounted on the respective opposed inner surfaces of the upper and lower cassette halves 413 and 414. An ultraviolet-cured coating 411 is formed on an outer surface of each of the spool support walls 417 and 418.

When the magnetic tape T runs, the outer surfaces of the spool support walls 417 and 418 slidingly contact the upper and lower portions of the inner peripheral surface of the reel hub 415.

According to the present invention, the outer surfaces of the spool support walls 417 and 418 are formed with the ultraviolet-cured coatings 411 and therefore are resistant to wear.

The ultraviolet-cured coatings 411 on the above contact portions are formed by coating onto these contact portions an ultraviolet-curing agent, such as one of the unsaturated polyester type, the unsaturated urethane-acrylate type, the unsaturated epoxy-acrylate type, the unsaturated polyester-acrylate type or the like, and then curing the coated agent by application of ultraviolet to effect surface hardening. Therefore, the upper and lower cassette halves can be molded using the conventional resin material and the conventional method, and then the ultraviolet-cured coating is formed on each of the above contact portions. Therefore, the manufacturing process is easy to implement.

In the above embodiments, the contact portions are prevented from wear to reduce the production of rubbed-off powder. Therefore, there is provided a magnetic tape cassette which has good magnetic recording characteristics and which can be manufactured at a low cost.

According to the principles of the present invention, the portions on which the ultraviolet-cured coatings 411 are to be formed are not limited to the above contact portions, and this coating can be applied to other various contact portions. Further, the present invention is not restricted to the above embodiments and can be extensively applied to a digital audio cassette, a 8-mm video cassette and the like.

In the magnetic tape cassette according to the above embodiments of the present invention, a hard coating for reducing wear is formed on one or both of the contact portions of each tape winding body having the magnetic tape wound therearound, the cassette case housing the tape winding body, and the tape winding body contacting part of the cassette case. With this arrangement, deformation of the contact portions and the production of rubbed-off powder are reduced. Thus, rubbed-off powder, which would otherwise adhere to the magnetic tape to cause various problems such as signal dropout, is not produced, thereby improving the magnetic recording characteristics of the magnetic tape cassette.

The cassette case of the magnetic tape cassette is made of a low-cost resin such as an ABS resin, and only necessary portions are hardened. Therefore, the manufacturing cost can be very much lower than that of a cassette made entirely of a special hard resin, and there can be provided a magnetic tape cassette at a lower cost.

Other preferred embodiments of the present invention will now be described with reference to the drawings.

Figure 15:
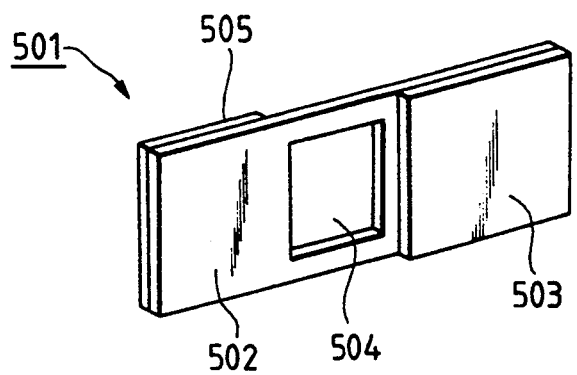
FIG. 15 is a perspective view of a preferred embodiment of a resilient pad of the present invention.

FIG. 15 is a perspective view of a resilient pad of the present invention used in a magnetic tape cassette.

The resilient pad 501 is a one-piece plate-like base 502 molded of a PET resin in the form of a rectangular plate, and an ultraviolet-cured coating 503 is formed on one side of the base at a front end portion thereof.

An opening 504 is formed through the base 502 at a central portion thereof so that the resilient pad 504 has a desired resiliency as a whole. Further, an adhesive layer 505 for attaching the resilient pad 501 to the magnetic tape cassette is formed on the other side of the base 502 at a proximal end portion thereof, which other side is opposite to the side on which the ultraviolet-cured coating 503 is formed.

Figure 16:
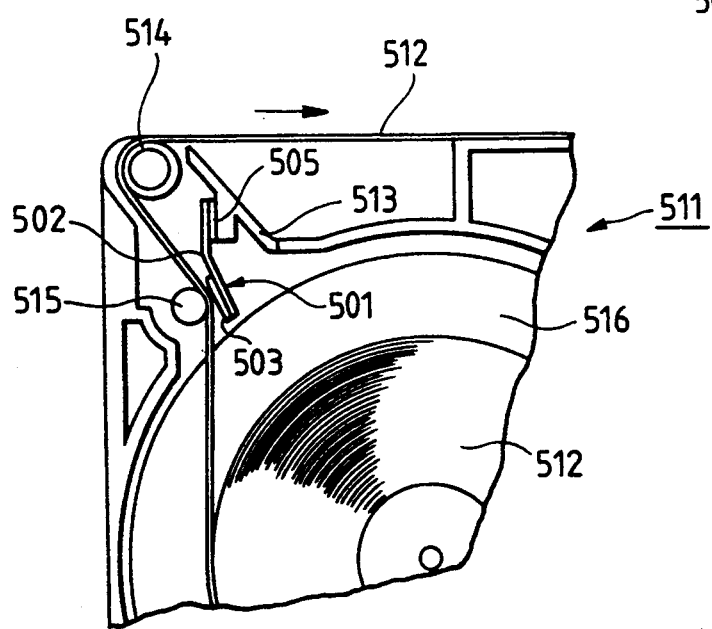
FIG. 16 is a partly broken-away top plan view of a portion of a magnetic tape cassette showing the manner of mounting of the resilient pad.
Figure 17:
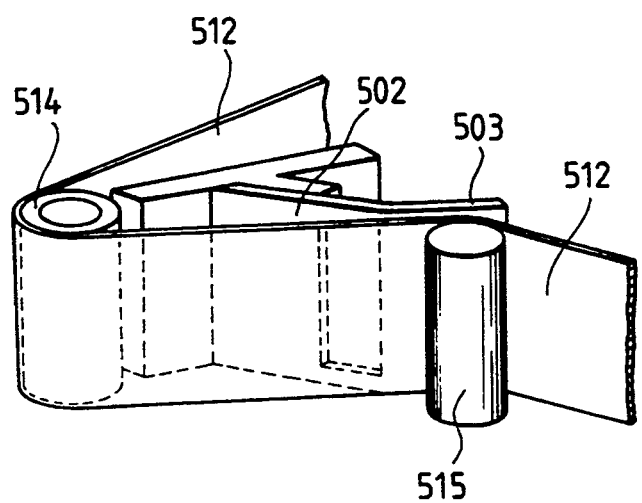
FIG. 17 is a perspective view of a relevant portion of the magnetic tape cassette showing the manner of mounting of the resilient pad.

As shown in FIGS. 16 and 17, the resilient pad 501 of the above construction is mounted on the magnetic tape cassette 511 in a conventional manner.

In the magnetic tape cassette 511, a magnetic tape 12 fed from a reel 516 runs through a guide pole 515 and a tape guide 514.

The tape guide 514 is cylindrical and is made of metal or a synthetic resin, the tape guide being rotatably fitted on a support pin of metal mounted on the magnetic tape cassette 511. The outer peripheral surface of each of the tape guide 514 and the guide pole 515 is smooth so that it will not damage the magnetic tape 512. A rotatable roller may be loosely fitted on the guide pole 515.

The pad 501 is adhesively bonded to an inner side of a wall 513 of the magnetic tape cassette 511 disposed at a front portion of the cassette. The resilient pad 501 is designed so that, in this condition, the ultraviolet-cured coating 503 is urged against the outer periphery of the guide pole 515 through the magnetic tape so that the resilient pad 501 is curved or deformed in its longitudinal direction as shown in the drawings. The elastic force produced by this deformation urges the magnetic tape 512 against the guide pole 515.

Therefore, when the magnetic tape 512 is to run in a direction of an arrow at a region close to a front opening of the magnetic tape cassette 511, the magnetic tape 512 runs under a desired tension.

Since the resilient pad 501 always urges the magnetic tape 512 against the outer periphery of the guide pole 515, the magnetic tape 512 is always held in sliding contact with the contact portion of the resilient pad 501.

In the above embodiment of the present invention, the ultraviolet-cured coating 503 is formed on that contact portion so that the surface cannot easily be worn. This coating is formed by coating an ultraviolet-curing agent such as one of the unsaturated polyester type, the unsaturated urethane-acrylate type, the unsaturated epoxy-acrylate type or the unsaturated polyester-acrylate type, and then curing the coated agent by ultraviolet radiation to provide a hardened surface.

Thus, the base 502 is made of an inexpensive PET resin, and the above-mentioned hard coating can be formed at a low cost. Therefore, the cost of the resilient pad 501 and hence the overall cost of the magnetic tape cassette 511 can be reduced.

Figure 18:
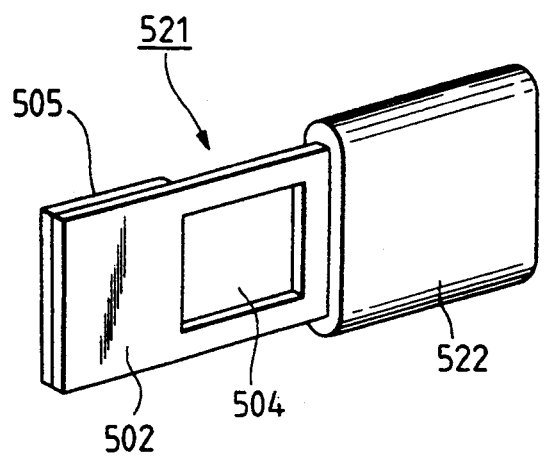
FIG. 18 is a perspective view of another embodiment of a resilient pad of the present invention.
Figure 19:
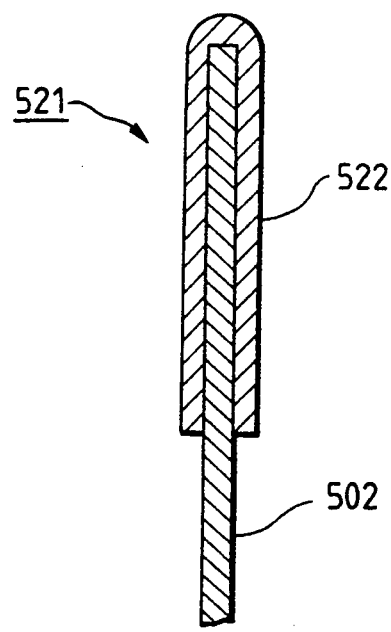
FIG. 19 is an enlarged cross-sectional view of a portion of the resilient pad of FIG. 18.

Another embodiment of the invention will now be described with reference to FIGS. 18 and 19.

Features of this embodiment reside in the shape of the ultraviolet-cured coating and a method of forming it.

More specifically, a base 502, an opening 504 and an adhesive layer 505 of a resilient pad 521 are the same as those described above. However, since an ultraviolet-cured coating 522 is formed by dipping, the ultraviolet-cured coating 522 is formed on the opposite sides of the base 502 as shown in FIG. 19 which is a longitudinal cross-sectional view.

With this construction of the ultraviolet-cured coating 522, the front end portion of the base 502 is entirely covered by the ultraviolet-cured coating 522, and therefore the front edge of the base 502 is not exposed.

Hence, the magnetic tape 512 will never be damaged by this front edge, and the reliability of the magnetic tape cassette 511 is thereby enhanced.

In the magnetic tape cassette according to these embodiments, the present invention, the hard coating of the ultraviolet-cured resin for reducing wear is formed on the contact portion of the resilient pad held in sliding contact while urging the magnetic tape so as to stabilize the running of the magnetic tape, thereby reducing the wear of the resilient pad. Therefore, the base of the resilient pad can be molded of an inexpensive PET resin or the like, and the hard coating is formed only on the above contact portion by a simple process. As a result, the cost of this resilient pad can be very much lower than that of a pad made entirely of a special wear-resistant resin, and this pad ensures stable running of the magnetic tape. Therefore, there can be provided an inexpensive magnetic tape cassette.

Figure 20:
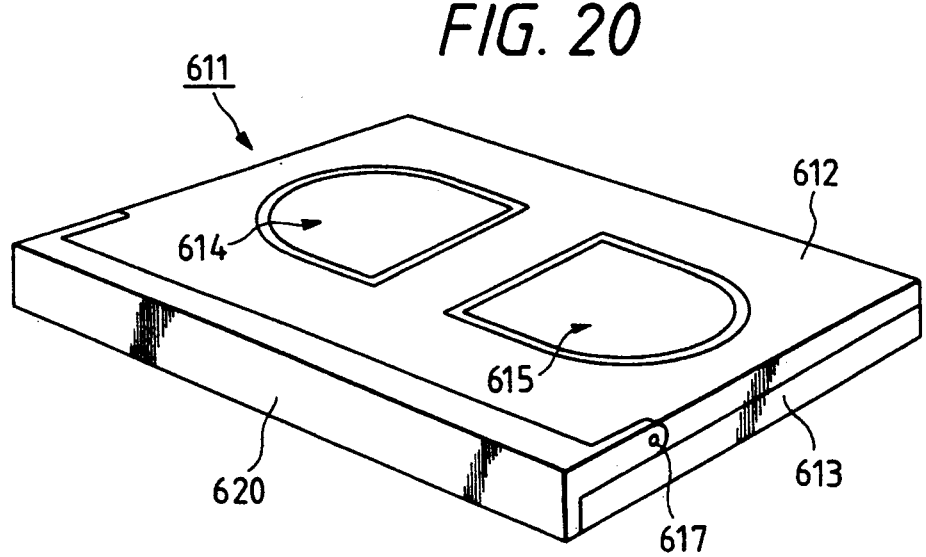
FIG. 20 is a perspective view of a still another magnetic tape cassette embodying the present invention.
Figure 21:
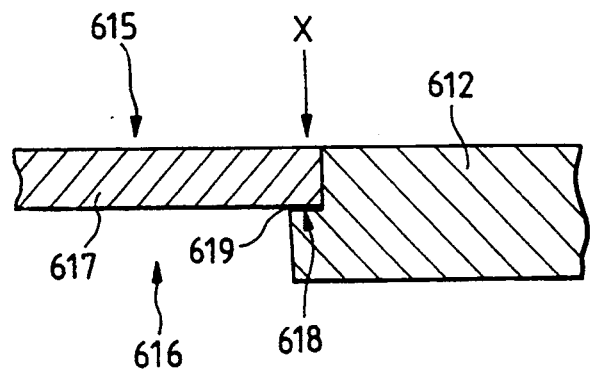
FIG. 21 is a fragmentary cross-sectional view of the magnetic tape cassette.

FIG. 20 is a perspective view of another magnetic tape cassette, showing its general configuration. FIG. 21 is a fragmentary cross-sectional view, showing a transparent window 615 of the magnetic tape cassette.

The magnetic tape cassette 611, which is used for a DAT (digital audio tape recorder), has a pair of upper and lower cassette halves 612 and 613, and a magnetic tape (not shown) wound on a pair of tape reels (not shown) is mounted within a space defined by these cassette halves so that the magnetic tape can run.

A pair of transparent windows 614 and 615 are provided at a flat portion of the upper cassette half 612 for the purpose of viewing the pair of tape reels and the magnetic tape.

A guard panel 620 is pivotally mounted by pivot pins 617a on a front portion of the magnetic tape cassette 611 so as to be opened and closed. When the magnetic tape cassette 611 is not in use, the guard panel 620 is in its closed position, as shown in the drawings, to thereby protect the magnetic tape. This guard panel is opened when the cassette is loaded into the DAT, whereupon the magnetic tape is pulled by a recording and playback device exposed at a front portion of the DAT so as to contact a magnetic head.

In the magnetic tape cassette 611 of the above construction, the transparent windows 614 and 615 are constructed as described below. The transparent windows 614 and 615 are of the same construction, and therefore only one of them, namely, the transparent window 615, will now be described with reference to FIG. 21.

The transparent window 615 includes a transparent synthetic resin plate 617 covering an opening 616 formed through the upper cassette half 612 molded of a synthetic resin.

The shape and size of the opening 616 are determined taking into consideration the position of mounting of the tape reels and from a viewpoint of design. A stepped portion 618 is formed on and extends along the edge portion of the opening 616. The edge portion of the transparent synthetic resin plate 617 is placed on the stepped portion 618 through an ultraviolet-cured resin 619.

The ultraviolet-cured resin 619 is covered by the transparent synthetic resin plate 617 so that light can be transmitted to the ultraviolet-cured resin through the plate 617. As a result, ultraviolet light is applied to the ultraviolet-curing resin 619 in the direction of an arrow X when curing the resin 619.

The ultraviolet-curing resin 619 is cured in this manner. The ultraviolet-curing resin 619 has a bonding function and therefore serves to bond the edge portion of the transparent synthetic resin plate 617 to the stepped portion 618 when the ultraviolet-curing resin 619 is cured.

The transparent windows 614 and 615 are assembled in the above-mentioned bonding steps. In the present invention, a projection serving in as a fusion rib used in the conventional ultrasonic bonding is not needed. In addition, after proper positioning operation is effected, the synthetic resin plate 617 can be bonded by fusion without further moving it. Therefore, the synthetic resin plate 617 will not be displaced out of position and can be easily mounted.

As the ultraviolet-curing resin, there can be used an ultraviolet-curing resin of the unsaturated polyester type, the unsaturated urethane-acrylate type, the unsaturated epoxy-acrylate type, the unsaturated epoxy-acrylate type, the unsaturated polyester-acrylate type or the like.

The synthetic resin plate 617 can be made of any resin so long as the resin has light transmitting properties.

In another embodiment, a transparent ultraviolet-curing resin may be coated onto the upper surface of the synthetic resin plate 617, in which case this ultraviolet-curing resin on the upper surface can be cured simultaneously with the curing of the ultraviolet-curing resin 619, thereby forming a hard coating on the above upper surface to protect against damage.

In this case, the fusion bonding of the transparent windows 614 and 615 is carried out simultaneously with the surface hardening treatment of the transparent windows 614 and 615. This prevents the transparent windows 614 and 615 from being subjected to damage in the course of long-term use and therefore prevents its appearance from being marred.

In the above embodiment, the ultraviolet-curing resin 619 is applied between the stepped portion 618 and the transparent synthetic resin plate 617. Instead of this arrangement, the ultraviolet-curing resin 619 may be applied to an area of contact between the vertical edge surface of the opening 616 and the vertical edge surface of the synthetic resin plate 617, and then cured by application of ultraviolet light to bond these two surfaces together.

The application of the present invention is not limited to DAT magnetic tape cassettes, and the invention can be suitably applied to video magnetic tape cassettes and other magnetic tape cassettes. Some conventional audio magnetic tape cassettes have upper and lower cassette halves made of a transparent synthetic resin and fastened together by screws. According to the present invention, such a construction can be modified in such a manner that ultraviolet-curing resin is applied to an area of contact between the upper and lower cassette halves to bond them together by application of ultraviolet. This obviates the need for the use of the screws and a screw fastening operation, and therefore the cost can be greatly reduced.

As described above, after the ultraviolet-curing resin is coated on the bonding surface, this resin is cured by application of ultraviolet light. This facilitates the bonding operation on the assembly line to thereby improve the automation of the manufacturing process. Therefore, the magnetic tape cassette can be manufactured at a lower cost.

In the magnetic tape cassette according to the present invention, the synthetic resin plate constituting the transparent window of the magnetic tape cassette is bonded to the edge portion of the opening of the upper cassette half through the ultraviolet-curing resin applied between the synthetic resin plate and the edge portion of the opening. Therefore, there is no need to provide a fusion rib, which has been required for the conventional ultrasonic bonding, and the shapes and constructions of those portions to be bonded can be simplified. In addition, the ultraviolet-curing resin can be suitably cured by application of ultraviolet, which facilitates the bonding operation and improves the easy of assembly of the magnetic tape cassette.

Further, when ultraviolet-curing resin is coated on the outer surface of the synthetic resin plate and then is cured, the transparent synthetic resin plate cannot easily be damaged. Therefore, there can be provided a magnetic tape cassette which is less costly and has an appearance which cannot be easily marred.

Still further preferred embodiments of the invention will now be described with reference to the drawings.

Figure 22:
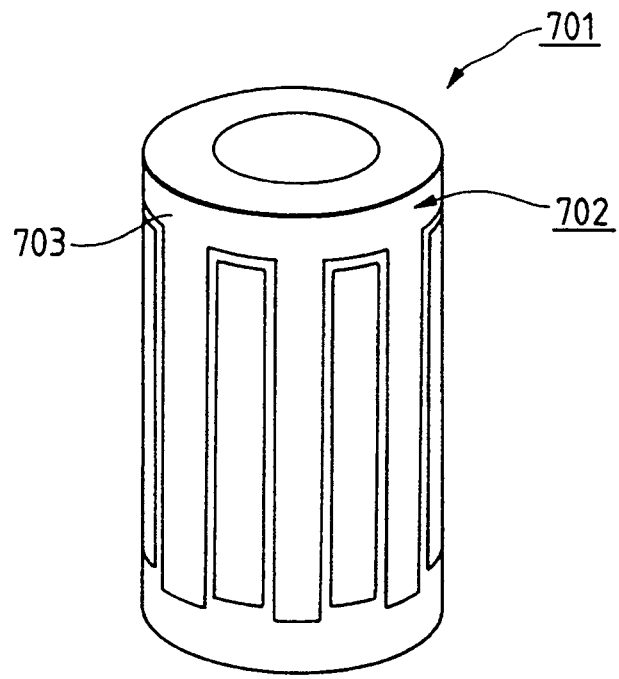
FIG. 22 is a perspective view of a preferred embodiment of a tape guide of the present invention.
Figure 23:
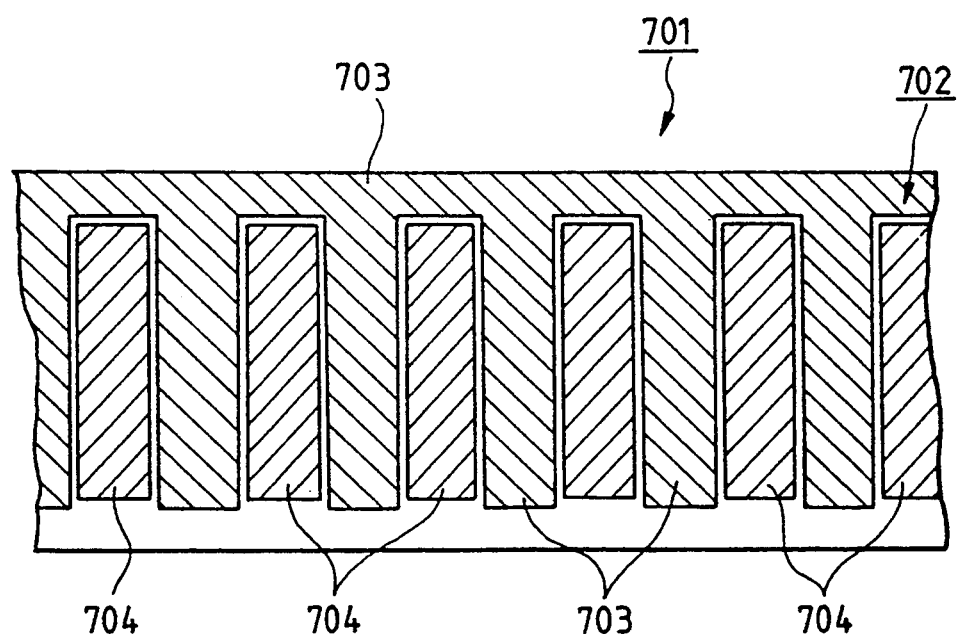
FIG. 23 is a developed view showing the arrangement of a high-hardness ultraviolet-cured coating and an antistatic ultraviolet-cured coating.

FIG. 22 is a perspective view of the tape guide used in a video tape cassette. FIG. 23 is a developed view of a surface of the tape guide showing the arrangement of a high-hardness ultraviolet-cured resin and an antistatic ultraviolet-cured resin for illustration purposes.

The tape guide 701 of one-piece cylindrical shape is molded of an ABS resin which is relatively inexpensive and has a good moldability. As shown in FIGS. 22 and 23, the high-hardness ultraviolet-cured resin and the antistatic ultraviolet-cured resin are formed on an outer peripheral surface 702 of the tape guide 701 in the form of stripes extending along the axis of the tape guide. More specifically, an antistatic ultraviolet-curing resin is coated in the form of comb teeth and then is cured by application of ultraviolet light to form the antistatic ultraviolet-cured coating 703. The high-hardness ultraviolet-cured coatings 704 made of a high-hardness ultraviolet-curing resin are discretely formed alternately with the antistatic ultraviolet-cured coating 703 in the circumferential direction of the tape guide. Each of the high-hardness ultraviolet-cured coatings 704 is formed by coating the high-hardness ultraviolet-curing resin on the outer peripheral surface 702 of the tape guide 701 in the shape of a rectangle and then curing it by application of ultraviolet light.

There is no need to apply ultraviolet radiation twice, and this can be carried out at a time after the high-hardness ultraviolet-curing resin and the antistatic ultraviolet-curing resin are both coated.

The electrical resistivity of the antistatic ultraviolet-cured coating 703 is determined to be not more than $1 \times 10^{11}$ $\Omega$/cm, and the high-hardness ultraviolet-cured coatings 704 are determined to have a hardness, for example, corresponding to a pencil hardness of not less than 5 H.

Examples of the high-hardness ultraviolet-curing resin include polyol acrylate resins made from compounds such as 1,6-hexane diol diacrylate, neopentyl glycol diacrylate, trimethylolpropane triacrylate, pentaerythritol triacrylate and pentaerythritol tetramethacrylate, polyester acrylate resins made from compounds such as α,ω-tetraacryl bis-trimethylolpropane tetrahydrophthalate and α,ω-dimethacryl bis-diethylene glycol phthalate, a urethane acrylate resin such as a compound obtained by reacting 2-hydroxyethyl acrylate (HEA) with a tolylene diisocyanate or isophorone diisocyanate and a compound obtained by reacting hexane diol, isophorone diisocyanate and HEA, epoxy acrylate resins made from compounds such as diacrylate of bisphenol A diglycidyl ether and trimethylolpropane polyglycidyl ether polyacrylate, and other including spiroglycol diglycidyl either diacrylate, silicone acrylate and trisacrylyl oxyethylene isocyanurate.

With respect to the antistatic ultraviolet-cured resin, its electrical resistivity can be adjusted to the above-mentioned value by incorporating an electrically conductive material, such as carbon particles and fibers, into the above-mentioned polyfunctional acrylates.

Figure 24:
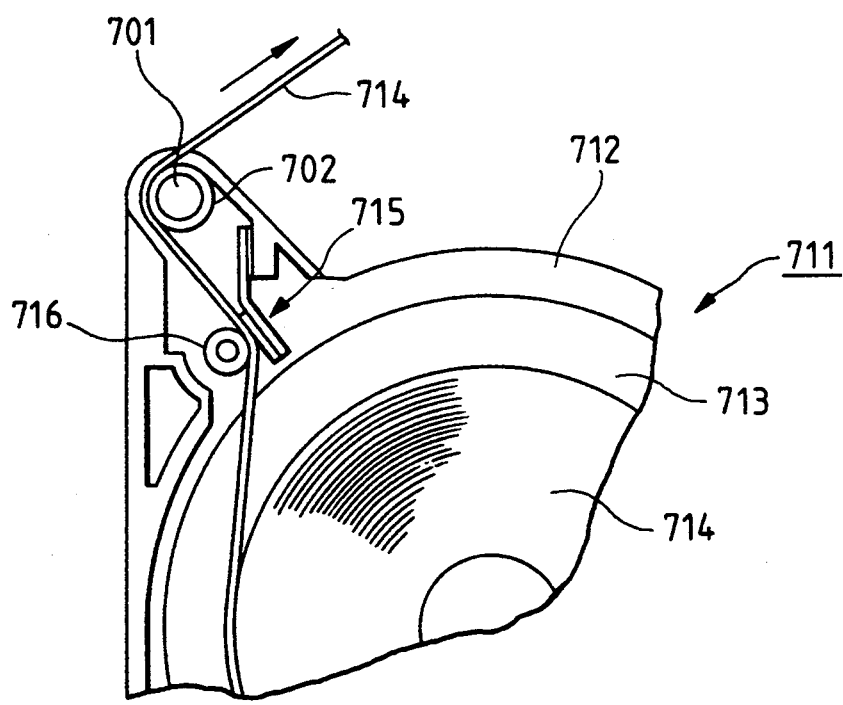
FIG. 24 is a plan view of a relevant portion of a video tape cassette showing a tape guide.
Figure 25:
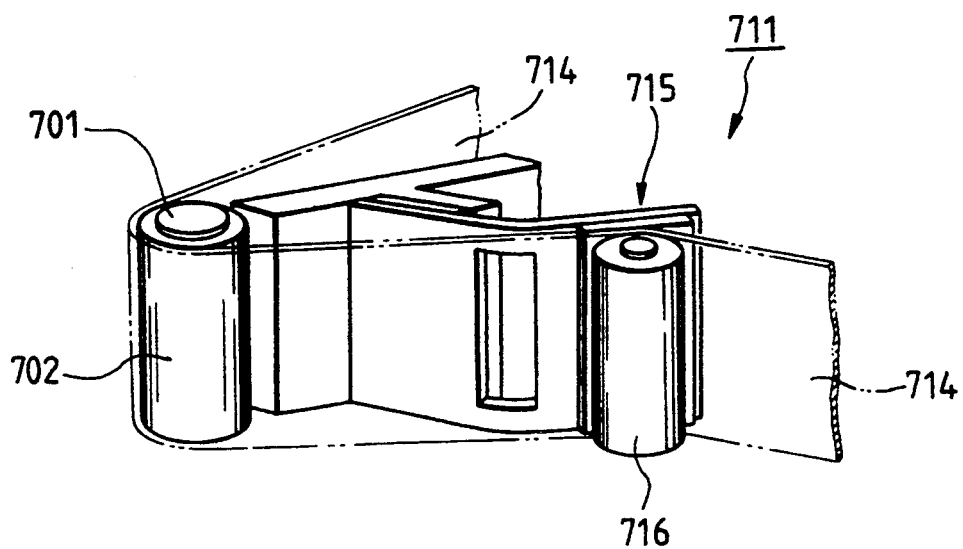
FIG. 25 is a fragmentary perspective view showing the sliding contact portion between the tape guide and the magnetic tape.

The tape guide 701 is used in a video tape cassette in a manner shown in FIGS. 24 and 25.

The overall construction of the video tape cassette is described in prior publications, and therefore in this embodiment only a relevant portion thereof where the tape guide 701 used will be described.

A pair of tape reels 713 are rotatably mounted on a case 712 of the video tape cassette 711. At the time of a recording and playback, the magnetic tape 714 wound around one of the tape reels 713 (for example, the supply reel) runs in contact with a magnetic head (not shown) disposed exteriorly of the cassette case in such a manner that the magnetic tape is urged sliding contact with the outer peripheral surface 702 of the tape guide 701.

With respect to the sliding contact between the magnetic tape 714 and the tape guide 701, the magnetic tape runs in such a manner that it slidingly contacts the high-hardness ultraviolet-cured coating 704 and the antistatic ultraviolet-cured coating 703 alternately.

Therefore, even if the magnetic tape is electrically charged when it slidingly moves over the high-hardness ultraviolet-cured coating 704, the magnetic tape is discharged when it is brought into sliding contact with the subsequent antistatic ultraviolet-cured coating 703 having a good electrical conductivity.

Since the spaced portions of the antistatic ultraviolet-cured coating 703 are connected together by its proximal portion (i.e., the upper portion in FIG. 22) in the form of a comb, the above discharge is positively carried out. This prevents undesirable problems such as an unstable running of the magnetic tape caused by attraction to the outer surface 702 of the tape guide 701 due to the static electric charges.

Further, since the high-hardness ultraviolet-cured coatings 704 are arranged alternately with the antistatic coating and spaced at a predetermined interval, the outer peripheral surface 702 of the tape guide 701 has an increased wear resistance, and therefore the tape guide can be used over a prolonged period of time. Further, the increased wear resistance reduces the amount of rubbing-off of the outer peripheral surface 702, and therefore rubbed-off powder is not produced. Thus, this also constitutes dust prevention measures.

Therefore, the video tape cassette to which the present invention is applied can be manufactured at lower costs and is more reliable in tape running performance and the like.

Although the above embodiment of the present invention has been described, the present invention is not to be restricted to such embodiment and various modifications can be made.

For example, depending on whether priority is given to the wear resistance or the antistatic property, the ratio of area of the high-hardness ultraviolet-cured coatings 704 to the antistatic ultraviolet-cured coating 703 can be suitably changed.

Also, in the above embodiment, the high-hardness ultraviolet-cured coatings and the antistatic ultraviolet-cured coating are alternately arranged in the circumferential direction of the tape guide 701 in the form of stripes extending parallel to the axis the tape guide. However, instead of this arrangement, for example, they can be arranged in inclined relation to the axis of the tape guide or can be arranged spirally. With such an inclined arrangement, the high-hardness ultraviolet-cured coating 704 and the antistatic ultraviolet-cured coating 703 can contact the magnetic tape 714 across the tape at the same time even if the diameter of the tape guide 701 as well as the angle of extension of the magnetic tape 714 around the tape guide is small. This positively achieves both of the antistatic effect and the wear resistance effect.

Further, the present invention is not restricted to the hollow or solid cylindrical member as described in the above embodiment, and can also be extensively applied to other guide members used in an audio tape cassette, a tape cassette for DAT and a tape cassette for an 8 mm video.

In the present invention, there is used the guide member which includes a body of a synthetic resin having a desired shape, for example, in the form of a hollow or solid cylinder, and the antistatic ultraviolet-cured coating of a low electrical resistance and the high-hardness ultraviolet-cured coating for increasing a wear resistance, both of which coatings are alternately formed on the outer peripheral surface of the cylindrical body in the form of stripes. Therefore, the guide member can simultaneously overcome two contradictory problems, that is, the prevention of static charges and the improvement of wear resistance, and therefore ensures stable running of the magnetic tape. Thus, in the magnetic tape cassette incorporating the above guide member, the attraction of the magnetic tape to the guide member due to the static charges will not occur, thereby stabilizing the tape running and enhancing the wear resistance. Thus, not only is the tape running stabilized, but also the production of rubbed-off powder of the guide member is restrained, thereby enhancing the reliability of the magnetic tape cassette.

What is claimed is:

1. In a magnetic tape cassette incorporating a guide member disposed in sliding contact with a magnetic tape for stabilizing the running of the magnetic tape, the improvement wherein said guide member comprises a cylindrical body molded of a synthetic resin, an antistatic ultraviolet-cured coating having a low electrical resistance of no more than $1 \times 10^{11}$ ohms/cm, and a high-hardness ultraviolet-cured coating having a pencil hardness of at least 5 H, said high-hardness ultraviolet-cured coating having a pencil hardness of at least 5 H being formed alternatively with the antistatic ultraviolet-cured coating having a low electrical resistance of no more than $1 \times 10^{11}$ ohms/cm on an outer peripheral surface of the cylindrical body in the form of stripes extending generally along the axis of the cylindrical body, arranged in an inclined relation to the axis of the cylindrical body, or arranged spirally.

2. The magnetic tape cassette of claim 1, wherein said high-hardness ultra-violet-cured coating is made of a material selected from the group consisting of polyol acrylate resins, polyester acrylate resins, urethane acrylate reins and epoxy acrylate resins.

3. The magnetic tape cassette of claim 2, wherein the polyol acrylate resins are selected from the group consisting of compounds made from 1,6-hexane diol diacrylate, neopentyl glycol diacrylate, trimethylolpropane triacrylate, pentaerythritol triacrylate and pentaerythritol tetramethacrylate.

4. The magnetic tape cassette of claim 2, wherein the polyester acrylate resins are selected from the group consisting of compounds made from $\alpha,\omega$-tetraacryl bis-trimethylolpropane tetrahydrophthalate and $\alpha,\omega$-dimethacryl bis-diethylene glycol phthalate.

5. The magnetic tape cassette of claim 2, wherein the urethane acrylate resins are selected from the group consisting of compounds obtained by reacting 2-hydroxyethyl acrylate with a tolylene diisocyanate or isophorone diisocyanate and a compound obtained by reacting hexane diol, isophorone diisocyanate and 2-hydroxyethyl acrylate.

6. The magnetic tape cassette of claim 2, wherein the epoxy acrylate resins are selected from the group consisting of compounds made from diacrylate of bisphenol A diglycidyl ether and trimethylolpropane polyglycidyl ether polyacrylate, and spiroglycol diglycidyl ether diacrylate, silicone acrylate and trisacrylyl oxyethylene isocyanurate.

* * * * *